(12) United States Patent
Morisada et al.

(10) Patent No.: US 7,672,503 B2
(45) Date of Patent: Mar. 2, 2010

(54) DIRECTION-RECOGNIZING APPARATUS, DIRECTION-RECOGNIZING METHOD, DIRECTION-RECOGNIZING SYSTEM, AND ROBOT APPARATUS

(75) Inventors: Hidehiko Morisada, Tokyo (JP); Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 1386 days.

(21) Appl. No.: 10/913,598

(22) Filed: Aug. 9, 2004

(65) Prior Publication Data

US 2005/0069173 A1 Mar. 31, 2005

(30) Foreign Application Priority Data

Aug. 29, 2003 (JP) .............................. 2003-307923

(51) Int. Cl.
*G06K 9/00* (2006.01)
(52) U.S. Cl. ....................................... 382/153; 382/151
(58) Field of Classification Search ................. 382/153, 382/151, 152, 154; 340/505, 10.52, 10.1
See application file for complete search history.

(56) References Cited

U.S. PATENT DOCUMENTS

| 7,177,459 B1 * | 2/2007 | Watanabe et al. ........... 382/151 |
| 2004/0252880 A1 * | 12/2004 | Takizawa et al. ............ 382/153 |

FOREIGN PATENT DOCUMENTS

| JP | 62-280986 | 12/1987 |
| JP | 3-50210 | 5/1991 |
| JP | 5-164706 | 6/1993 |
| JP | 5-165968 | 7/1993 |
| JP | 6-24424 | 2/1994 |
| JP | 7-121713 | 5/1995 |
| JP | 9-53939 | 2/1997 |
| JP | 9-229646 | 9/1997 |
| JP | 2001-307090 | 11/2001 |
| JP | 2003-216931 | 7/2003 |

* cited by examiner

*Primary Examiner*—Brian P Werner
*Assistant Examiner*—Claire Wang
(74) *Attorney, Agent, or Firm*—Oblon, Spivak, McClelland, Maier & Neustadt, L.L.P.

(57) ABSTRACT

A direction-recognizing apparatus has a photographing unit, an image database, an image-recognizing unit, and a direction-recognizing unit. The database stores registered images and direction-data items associated with the registered images. The image-recognizing unit receives an input image and compares the input image with the registered images stored in the database. The image-recognizing unit selects one registered image that is identical or similar to the input image. The direction-recognizing unit recognizes a direction from the direction data associated with the registered image selected by the image-recognizing unit. The database may store N direction-data items associated with N surface segments $S_N$ of the circumferential surface of a pole. If so, the images registered in the database represent direction-recognition regions $AS_N$ that are larger than the N surface segments $S_N$.

25 Claims, 25 Drawing Sheets

80

| DESTINATION NODE / ACTION | NAME OF INPUT EVENT | DATA NAME | RANGE OF DATA | PROBABILITY OF TRANSITION TO OTHER NODES | | | | ... | |
|---|---|---|---|---|---|---|---|---|---|
| | | | | A | B | C | D | | n |
| node 100 | | | | node 120 | node 120 | node 1000 | | | node 600 |
| ACTION | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SURPRISE | 50.100 | | | | | | |
| 8 | | SADNESS | 50.100 | | | | | | |

FIG. 25

DIRECTION-RECOGNIZING APPARATUS, DIRECTION-RECOGNIZING METHOD, DIRECTION-RECOGNIZING SYSTEM, AND ROBOT APPARATUS

BACKGROUND OF THE INVENTION

1. Field of the Invention

The present invention relates to a direction-recognizing apparatus and a direction-recognizing method, in which a direction-indicating member recognizes a direction from an image input to it. The invention relates to a direction-recognizing system, too, which comprises a direction-indicating member and a direction-recognizing apparatus. The invention also relates to a robot apparatus that has a direction-recognizing apparatus.

2. Description of the Related Art

Any apparatus that is electrically or magnetically drive to move like a man (animal) is called "robot." It is in 1960s that robots came into wide use. Most of them were industrial robots such as manipulators and transportation robots, which are designed to achieve automation or to save labor.

Recently, so-called "service robots" have been developed. They are designed to act as living partners to people, assisting and supporting people in social life and daily life. Unlike industrial robots, service robots are able to learn how to respond to the human friends who differ in personality, in various ways in accordance with the specific conditions in which the human partners are living. Of the service robots hitherto developed, so-called "pet-type robots" that look and act like a four-legged animal (e.g., dog or cat) and so-called "humanoid robots" that look, walk and act like man have been put to practical use.

Unlike industrial robots, pet-type robots and humanoid robots can act to entertain their human friends. This is why they are called "entertainment robots" in some cases. Some entertainment robots have various sensors such as a CCD (Charge-Coupled Device) camera, a microphone and the like. They recognize the conditions of their environment by using the sensors and autonomously act in accordance with the environmental conditions they have recognized.

The entertainment robot is designed to perform various intelligent activities. For example, the robot recognizes the user's face, finds and avoids an obstacle, and finds and approaches an object. Some entertainment robots can identify its own position from the images that the camera has acquired and which show landmarks or the like. A position-detecting apparatus that enables a robot to recognize its position is disclosed in Jpn. Pat. Appln. Laid-Open Publication No. 10-109290. This position-detecting apparatus determines the position of the robot from the positional relation between three landmarks (e.g., three balls of different colors) placed in the region where the robot may walk around.

This method needs a plurality of landmarks in order to detect the position of the robot. In addition, the positional relation between the landmarks must be recognized to determine the position of the robot. If one landmark, for example, cannot be found, it is no longer possible to detect the position of the robot correctly. Since all landmarks must be recognized, it inevitably takes a long time to detect the position of the robot. Further, it is necessary to place a plurality of landmarks in the region in which the robot may walk. In view of this, the position-detecting method is not fit for use in entertainment robots.

SUMMARY OF THE INVENTION

The present invention has been made in view of the foregoing. An object of the invention is to provide a direction-recognizing apparatus, direction-recognizing method and direction-recognizing system that can recognize various directions by using a direction-indicating member, and a robot apparatus that incorporates the direction-recognizing apparatus.

To achieve the object, a direction-recognizing apparatus according to this invention is designed to recognize at least N different directions (N≧2) by using a direction-indicating member. The apparatus comprises: a memory means storing N registered images for identifying the N directions and direction-data items associated with the registered images, respectively; an image-recognizing means for comparing an input image of the direction-indicating member, photographed in a given direction, with the N registered images, and for extracting one of the registered images which is determined to be identical or similar to the input image of the direction-indicating member; and a direction-recognizing means for recognizing the direction in which the input image has been photographed, from the direction-data item associated with the registered image extracted. The direction-indicating member has N surfaces that can be identified when viewed in the N different directions.

In the present invention, the input image of the direction-indicating member that has N surfaces that can be identified when viewed in the N different directions is compared with the registered images that are associated with the direction-data items prepared. Hence, the apparatus can recognize, from the input image, the direction in which the direction-indicating member has been photographed. The apparatus can therefore recognize N or more directions, by using the direction-indicating member, i.e., a single object.

The registered images include the images of the N surface segments of the direction-indicating member, respectively, and are larger than the images of the N surface segments obtained by dividing the surface of the direction-indicating member by N. They are used to identify surfaces, each being larger than a 360°/N surface segment, where 360° is the circumference of the direction-indicating member. Since the registered images are larger than the images of the N surface segments, the apparatus can recognize directions at higher accuracy than otherwise.

The direction-indicating member may have, on the surface, a pattern that has no periodicity. And the registered images may be extracted from pattern data representing the pattern provided on the surface of the direction-indicating member, each including the image of one surface segment and being larger than the image of the surface segment. In addition, each registered image can be an image of the direction-indicating member, photographed in one of the N directions.

The direction-indicating member may be a pole. The registered images are larger than N surface segments obtained by dividing the circumferential surface of the pole by N in the circumferential direction thereof. Each registered image is used to identify a surface segment of the pole, which is larger than one N surface segment.

Another direction-recognizing apparatus according to this invention is designed to recognize at least N different directions (N≧2) by using a direction-indicating member. This apparatus comprises: a memory means storing an image having N regions for identifying the N directions and storing direction-data items that are associated with the N regions of the image, respectively; an image-recognizing means for comparing an input image of the direction-indicating member, photographed in a given direction, with the N regions of the image, and for extracting one of the stored N regions of the image, which is determined to be identical or similar to the input image of the direction-indicating member; and a direction-recognizing means for recognizing the direction in which the input image has been photographed, from the direction-data item associated with the stored region extracted. The direction-indicating member has N surfaces that can be identified when viewed in the N different directions.

In the present invention, the images of the regions of the direction-indicating member, each photographed in one direction, are registered, and a direction-data item is associated with a part of each registered image. Thus, the apparatus can recognize any direction when the image-recognizing means extracts one of the stored N regions of the image, which is determined to be identical or similar to the input image of the direction-indicating member.

A direction-recognizing method according to the invention is designed to recognize at least N different directions (N≧2) by using a direction-indicating member. The method comprises: a step of comparing an input image of the direction-indicating member, photographed in a given direction, with N registered images stored in the memory means for identifying the N directions, and then extracting one of the registered images which is determined to be identical or similar to the input image of the direction-indicating member; and a step of recognizing the direction in which the input image has been photographed, from the direction-data item associated with the registered image extracted. The direction-indicating member has N surfaces that can be identified when viewed in the N different directions.

Another direction-recognizing method according to this invention is designed to recognize at least N different directions (N≧2) by using a direction-indicating member. This method comprises: a step of comparing an input image of the direction-indicating member, photographed in a given direction, with N registered regions stored in the memory means for identifying the N directions, and then extracting one of the registered regions which is determined to be identical or similar to the input image of the direction-indicating member; and a step of recognizing the direction in which the input image has been photographed, from the direction-data item associated with the registered region extracted. The direction-indicating member has N surfaces that can be identified when viewed in the N different directions.

A direction-recognizing system according to the invention comprises a direction-indicating member that is used to recognize at least N different directions (N≧2), and a direction-recognizing apparatus which uses the direction-indicating member to recognize directions. The direction-indicating member has N surfaces that can be identified when viewed in the N different directions. The direction-recognizing apparatus has: a memory means storing N registered images for identifying the N directions and direction-data items associated with the registered images, respectively; an image-recognizing means for comparing an input image of the direction-indicating member, photographed in a given direction, with the N registered images, and for extracting one of the registered images which is determined to be identical or similar to the input image of the direction-indicating member; and; a direction-recognizing means for recognizing the direction in which the input image has been photographed, from the direction-data item associated with the registered image extracted.

Another direction-recognizing system according to the present invention comprises a direction-indicating member that is used to recognize at least N different directions (N≧2), and a direction-recognizing apparatus which uses the direction-indicating member to recognize directions. The direction-indicating member has N surfaces that can be identified when viewed in the N different directions. The direction-recognizing apparatus has: a memory means storing an image having N regions for identifying the N directions and storing direction-data items that are associated with the N regions of the image, respectively; an image-recognizing means for comparing an input image of the direction-indicating member, photographed in a given direction, with the N regions of the image, and for extracting one of the stored N regions of the image, which is determined to be identical or similar to the input image of the direction-indicating member; and a direction-recognizing means for recognizing the direction in which the input image has been photographed, from the direction-data item associated with the stored region extracted.

A robot apparatus according to the present invention can autonomously acts. It has a direction-recognizing apparatus that uses a direction-indicating member to recognize at least N different directions (N≧2). The direction-recognizing apparatus comprises: a memory means storing N registered images for identifying the N directions and direction-data items associated with the registered images, respectively; an image-recognizing means for comparing an input image of the direction-indicating member, photographed in a given direction, with the N registered images, and for extracting one of the registered images which is determined to be identical or similar to the input image of the direction-indicating member; and a direction-recognizing means for recognizing the direction in which the input image has been photographed, from the direction-data item associated with the registered image extracted. The direction-indicating member has N surfaces that can be identified when viewed in the N different directions.

Another robot apparatus according to this invention can autonomously acts. It has a direction-recognizing apparatus that uses a direction-indicating member to recognize at least N different directions (N≧2). The direction-recognizing apparatus comprises: a memory means storing an image having N regions for identifying the N directions and storing direction-data items that are associated with the N regions of the image, respectively; an image-recognizing means for comparing an input image of the direction-indicating member, photographed in a given direction, with the N regions of the image, and for extracting one of the stored N regions of the image, which is determined to be identical or similar to the input image of the direction-indicating member; and a direction-recognizing means for recognizing the direction in which the input image has been photographed, from the direction-data item associated with the stored region extracted. The direction-indicating member has N surfaces that can be identified when viewed in the N different directions.

The direction-recognizing apparatus and the direction-recognizing system, both according to this invention, use a direction-indicating member having N surfaces that can be identified when viewed in the N different directions. N images for identifying N directions and the direction-data items associated with these N images are registered. Thus, the apparatus and system can recognize any direction by extracting one of the registered images which is determined to be identical or similar to the input image of the direction-indicating member and then by determining the direction in which the input image has been photographed, from the direction-data item associated with the registered image extracted.

The direction-recognizing apparatus may be incorporated in a robot apparatus. Then, the robot apparatus can recognize the direction in which any image input to it has been photographed. The robot apparatus may have a distance sensor, for example, which detects the distance to an object. Then, the robot apparatus can efficiently approach the object in accordance with the direction recognized and the distance detected. This can make the robot apparatus look intelligent.

BRIEF DESCRIPTION OF THE DRAWINGS

FIG. 25 is a state-transition table prepared for the nodes of the finite-probability automaton.

DETAILED DESCRIPTION OF THE PREFERRED EMBODIMENTS

An embodiment of the present invention will be described in detail, with reference to the accompanying drawings. This embodiment is a two- or four-legged robot apparatus. The robot apparatus incorporates a direction-recognizing apparatus that can determine the direction of an object.

The direction-recognizing apparatus and the robot apparatus use a direction-indicating member to recognize the direction of an object. The direction-indicating member and the direction-recognizing apparatus that uses the member will be first described. Then, an appropriate technique employed in the apparatus to recognize directions will be explained. Finally, the robot apparatus having the direction-recognizing apparatus will be described.

(1) Direction Recognition by the Direction-Indicating Member

The direction-indicating member that helps a moving body, such as a robot apparatus, to recognize directions. The direction-indicating member has a pattern printed on it. If the camera on the body (e.g., the robot apparatus) takes a picture showing the direction-indicating member in the middle, the orientation of the body can be recognized from the pattern photographed.

Figure 1:
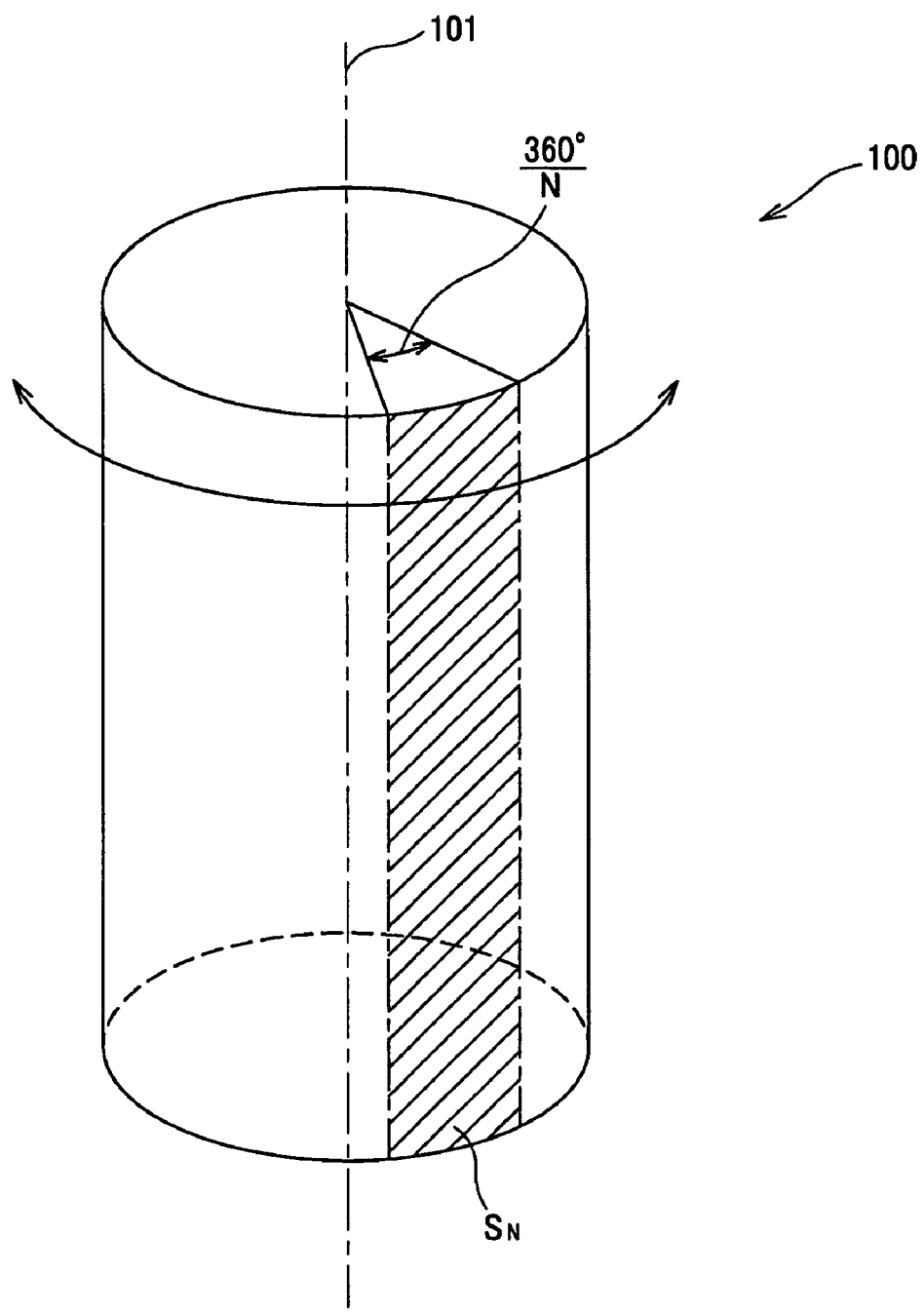
FIG. 1 is a perspective view of a pole that is used as a direction-indicating member in an embodiment of the present invention.

Assume that the direction-indicating member is a pole as illustrated in FIG. 1 and that a pattern having no periodicity is printed on the circumferential surface of the pole. The pole is arranged perpendicular to the ground. The pole is divided in the horizontal plane to the axis of the pole, into an N number of sectors. Then, the pattern on the circumferential surface of the pole is also divided into N segments, which serve as data items representing different directions. The pattern segments are registered in one-to-one association with the respective directions. The direction-recognizing apparatus or the robot apparatus that incorporates the apparatus may take a picture of the direction-indicating pole and compare the picture with the pattern segment registered. Then, the direction-recognizing apparatus or robot apparatus can recognize its own orientation, by determining which pattern segment registered is most similar to the pattern shown in the latest picture of the pole.

Figure 2:
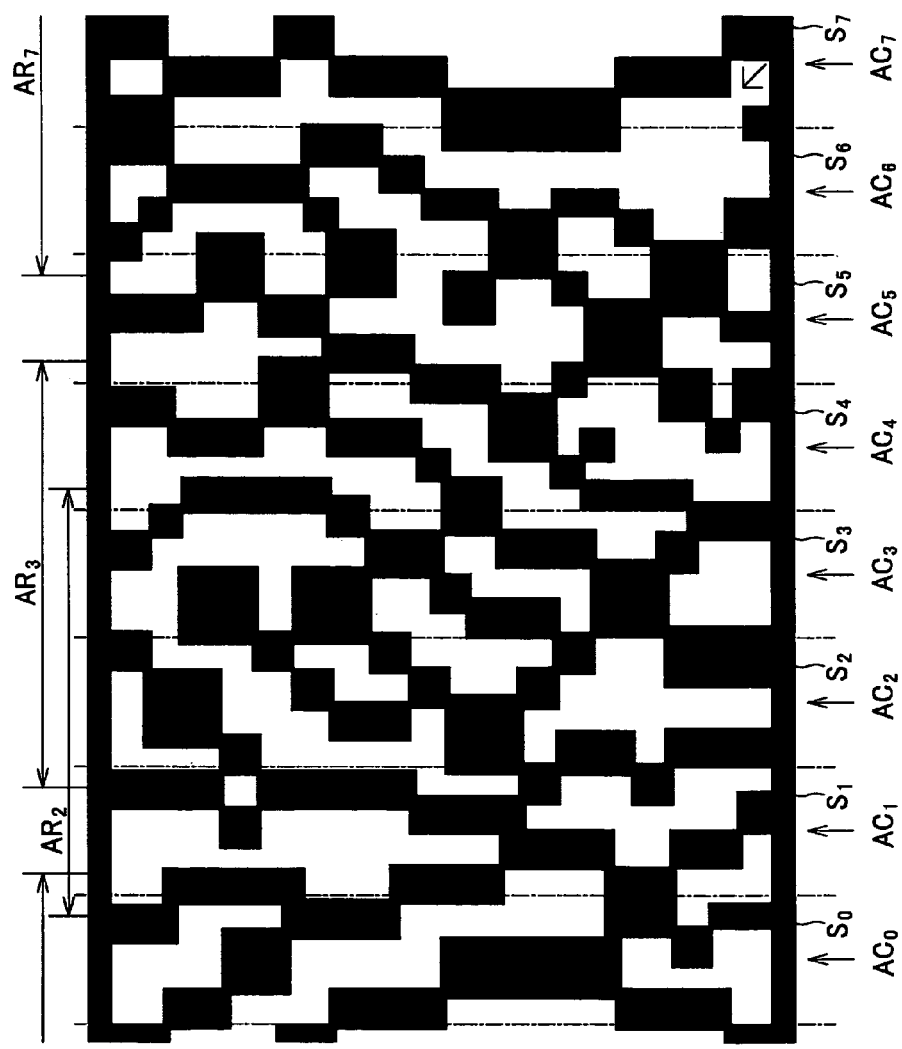
FIG. 2 is a diagram showing the pattern printed on the circumferential surface of the pole.

FIG. 1 is a perspective view of the pole 100 used as direction-indicating member in this embodiment of the invention. FIG. 2 is a diagram showing the pattern printed on the circumferential surface of the pole 100.

As FIG. 1 shows, the pole 100 is arranged perpendicular to the ground. Assume that the pole 100 is divided into N segments, along radial lines that are perpendicular to the axis 101 of the pole 100. Each segment has a sector-shaped cross section having a central angle of 360°/N, and has a curved surface $S_N$. That part of the pattern, which is printed on the curved surface $S_N$ of one segment, represents one specific direction. Hence, the pattern on the circumferential surface of the pole 100 represents, as a whole, N radial directions from the axis 101 of the pole 100.

For simplicity of description, it is assumed that the pole 100 is divided into 8 segments, N=8. Number N may of course be other than 8 as is needed. It may 4 (N=4), 16 (N=16) or the like.

The pattern printed on the circumferential surface of the pole 100 is a geometrical one shown in FIG. 2. As seen from FIG. 2, this pattern has no periodicity. The pattern consists of N segments $AR_N$, each representing a specific direction. These pattern segments $AR_N$ may be identical in part, but should be different, one from the other, so that they can be distinguished from one another by the direction-recognizing apparatus that is incorporated in the moving object.

In this embodiment, the pattern that serves to recognize the orientation of the moving body is printed on the circumferential surface of the pole 100. If the direction-indicating member is a sphere, not a pole, the pattern is printed on the spherical surface of the member. If the direction-indicating member is a bar having a semicircular cross section, the pattern is printed on the curved surface of the bar. No matter whichever shape the member has, the pattern printed on the member can serve to recognize the orientation of the moving body such as a robot apparatus if the moving object has a photographing means.

In the present embodiment, the pole 100 consists of eight segments of the same size, each having a pattern segment that represents a unique direction. Nevertheless, no pattern segments may be printed on the circumferential surface of the pole 100. Instead, the pole 100 may have projections or depressions at its circumferential surface if the projections or depressions can enable the direction-recognizing apparatus to recognize the orientation of the moving body.

The pole 100 consists of eight segments in this embodiment. Hence, its circumferential surface consists of eight surface segments $S_0$ to $S_7$ as is illustrated in FIG. 2. Eight pattern segments printed on the surface segments $S_0$ to $S_7$ represent eight directions, respectively. As seen from FIG. 2, the pole 100 has height $H_P$ and radius $R_P$. Each surface segment has height $H_P$ and width $2\pi R_P/N$.

Figure 3:
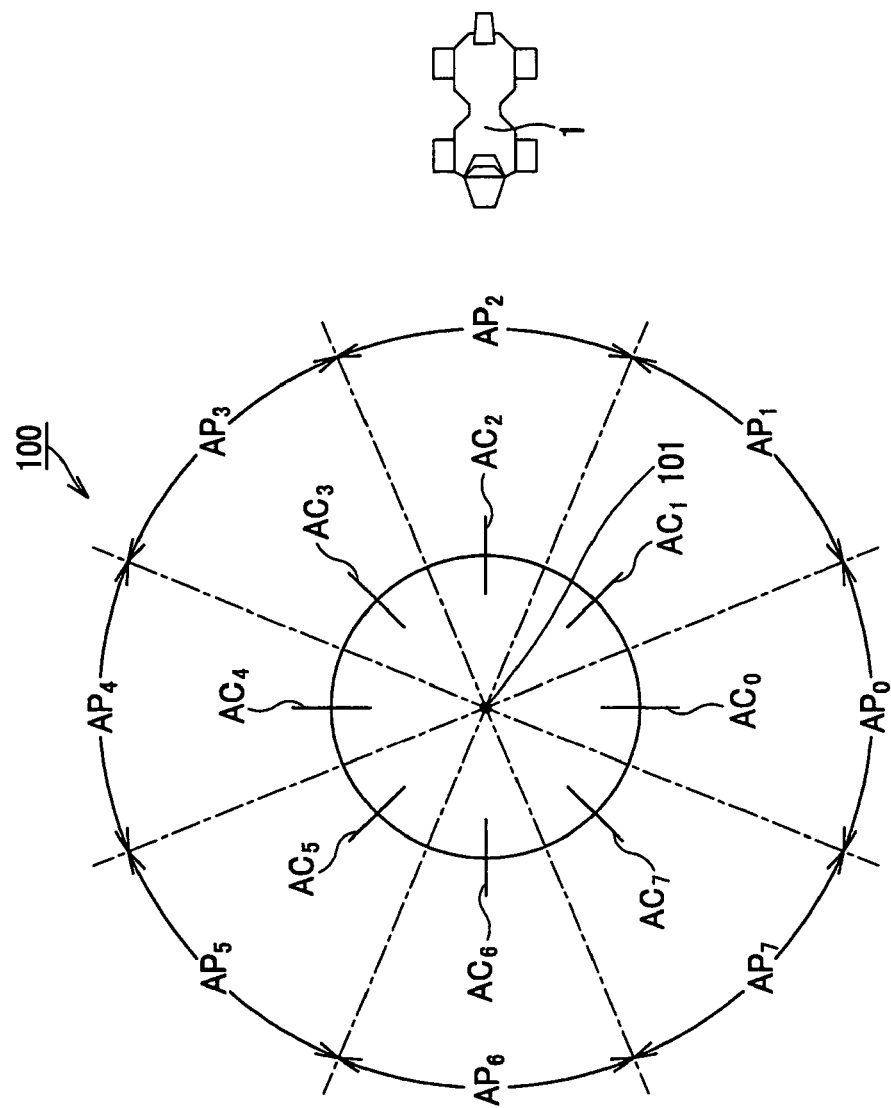
FIG. 3 is a top view of the pole, explaining how to divide the pattern into segments.

FIG. 3 is a top view of the pole 100, explaining how the pole 100 is divided into eight segments of the same size, and hence, how the pattern is divided into eight segments. As FIG. 3 depicts, the pole 100 is divided into eight segments (where N=8), along radial lines that are perpendicular to the axis 101 of the pole 100. Thus, the eight pole segments have surface segments $S_0$ to $S_7$, respectively, and each segment of the pole 100 has a sector-shaped cross section having a central angle of 45°. The radial lines extending from the axis of the pole 100 define, between them, eight sector-shaped regions $AP_0$ to $AP_7$. Note that the bisector of the sector-shaped cross section of each pole segment intersects with the arc of the cross section at point $AC_N$ (where N=0, 1, 2, . . . or 7).

Eight directions are allocated to the eight surface segments $S_0$ to $S_7$ of the pole 100. The line connecting the axis 101 and the point $AC_0$ is used as reference direction (0°). Then, seven lines connecting the axis 101 and other seven points $AC_1$ to $AC_7$ indicates seven directions of 45°, 90°, . . . 315°. Thus, eight direction-data items representing 0°, 45°, 90°, . . . 315° can be assigned to the surface segments $S_0$ to $S_7$ of the pole 100. The robot apparatus 1 can determine that its orientation is 90° when it moves such that the direction-recognizing apparatus photographs the surface $S_2$ of the pole 100, which exists in the sector-shaped region $AP_2$. This is because the direction of 90° is assigned to the third surface segments $S_2$ of the pole 100.

Figure 4:
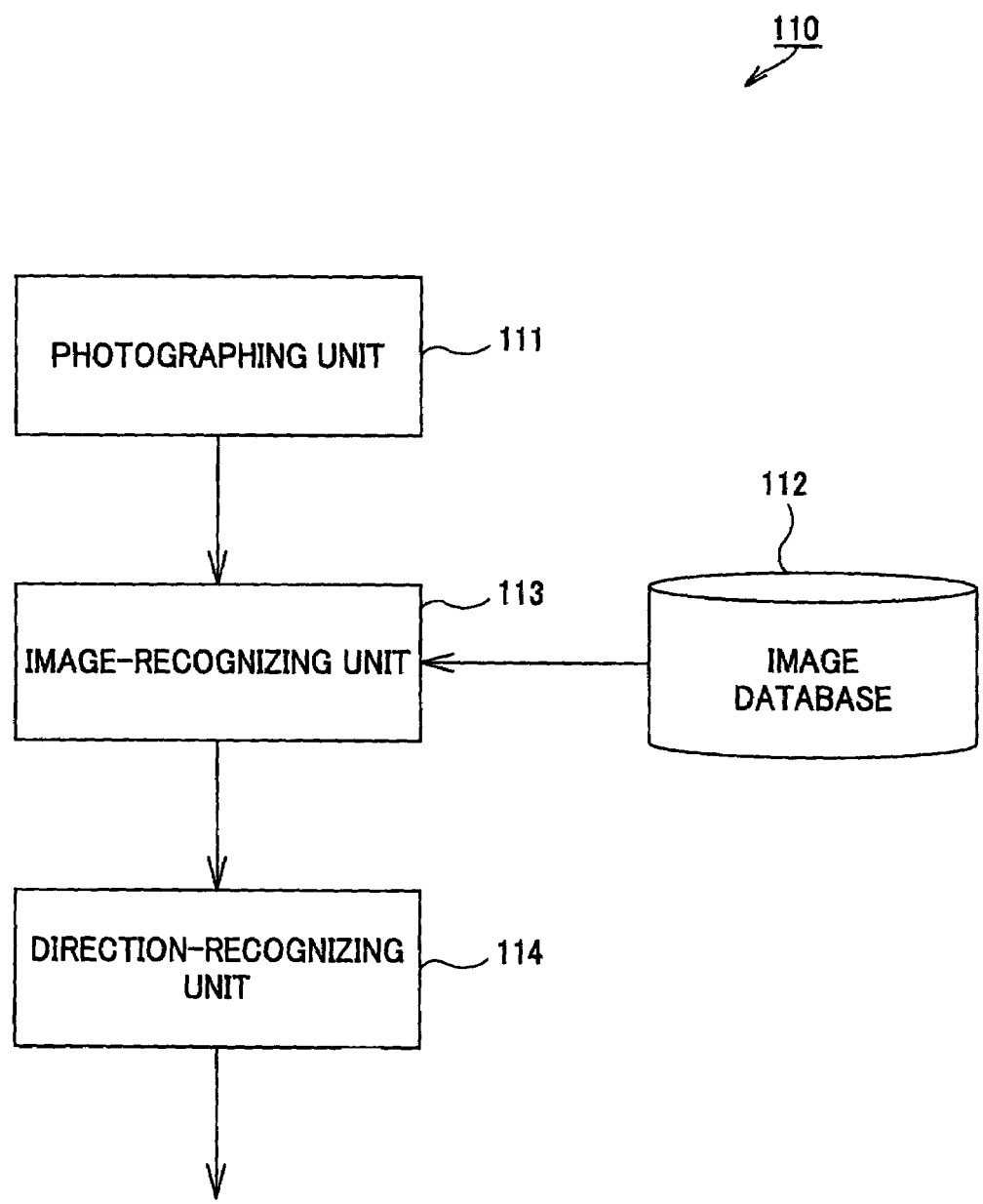
FIG. 4 is a block diagram of the direction-recognizing apparatus used in the embodiment.

It will be explained how this embodiment, i.e., a direction-recognizing apparatus, recognizes the orientation of the robot apparatus that incorporates the direction-recognizing apparatus. FIG. 4 is a block diagram of the direction-recognizing apparatus 110. As seen from FIG. 4, the direction-recognizing apparatus 110 has a photographing unit 111, an image database 112, an image-recognizing unit 113, and a direction-recognizing unit 114. The photographing unit 111 is, for example, a CCD camera or a CMOS (Complementary Metal Oxide Semiconductor) image sensor. The image database 112 contains image-data items representing images of the pole 100, viewed from various directions. The database 112 also contains direction-data items representing the directions associated with the various directions. The image-recognizing unit 113 receives image data from the photographing unit 111, which represents the image of the pole 100. The unit 113 compares the image data received from the unit 111 with the image-data items contained in the image database 112. The unit 113 extracts, from the database 112, the image-data item most similar to the image data received from the photographing unit 111. The direction-recognizing unit 114 determines the orientation of the robot apparatus 1, from the direction-data item associated with the image-data item most similar to the image data that the image-recognizing unit 113 has received from the photographing unit 111.

The image database 112 further contains pattern-data items representing the pattern segments $AR_N$ printed on the surface segments $S_0$ to $S_7$ of the pole 100 and direction-data items associated with the pattern-data items. Note that the direction-data items represent the directions assigned to the surface segments $S_0$ to $S_7$ of the pole 100, respectively. The pattern-data items contained in the database 112 may have been selected from many pattern-data items prepared beforehand. Alternatively, they may be those that represent the images actually photographed of the pattern segments $AR_N$, or those that have been prepared by processing the images actually photographed of the pattern segments $AR_N$.

To determine eight orientations that the robot apparatus 1 may take, the pole 100 should be divided into eight segments that have surface segments $S_0$ to $S_7$, respectively, and the eight pattern segments $AR_N$ printed on the surface segments $S_0$ to $S_7$ should be recognized. As is evident from FIG. 1, too, any image photographed of the pole 100 represents the curved surface of a sector of the pole 100, which is broader than one surface segment (e.g., $S_1$) having central angle of 45° and which has a central angle ranging from 150° to 180°. On the basis of this fact, the inventors thereof have found that the image of each pattern segment printed on one surface segment $S_N$ can be recognized at high efficiency if it is compared with registered images of broader pattern segments.

The sector-shaped cross section of each of N pole segments has a central angle of 360°/N. Nonetheless, the image-data items registered for use in recognizing directions represent images of the broad pattern segments, each printed on the curved surface of a sector segment whose sector-shaped cross section has a central angle θ that is greater than 360°/N (θ>360°/N). That is, each image-data item registered represents the pattern segment printed on one surface segment that has a width greater than $2\pi R_P/N$. Each image-data items registered for use in recognizing directions includes data that represents the pattern segment printed on the curve surface $S_N$ of one pole segment. Each data item registered for use in recognizing a direction represents a pattern, whose center part is the pattern segment printed on the curve surface $S_N$ of a pole segment. Since the image-data items registered represent pattern segments that are broader than pattern segments on the curve surfaces $S_N$, errors in recognizing directions can be reduced.

As FIG. 2 shows, the image-data item registered to recognize the direction indicated by the pattern segment printed on, for example, the surface segment $S_2$ located at point $AC_2$ represents the pattern segment $AR_2$. The pattern segment $AR_2$ is printed on not only the surface segment $S_2$, but also the adjacent surface segments $S_1$ and $S_3$. Similarly, the image-data item registered to recognize the direction indicated by the pattern segment printed on the surface segment $S_3$ located at point $AC_3$ represents the pattern segment $AR_3$. The pattern segment $AR_3$ is printed on not only the surface segment $S_3$, but also the adjacent surface segments $S_2$ and $S_4$.

In other words, each image-data item registered to recognize a direction represents a pattern segment $AR_N$ that covers some surface segments $S_N$. The direction-recognizing apparatus 110 recognizes each pattern segment $AR_N$, to determine the direction assigned to one surface segment $S_N$ of the pole 100. The apparatus 110 therefore acquires the data representing the direction assigned to the surface segment $S_N$. In view of this, the pattern segments $AR_N$ must be unique so that they may be distinguished from one another. FIG. 2 illustrates such pattern segments $AR_N$. These constitute a geometrical pattern that has no periodicity.

Figure 5:
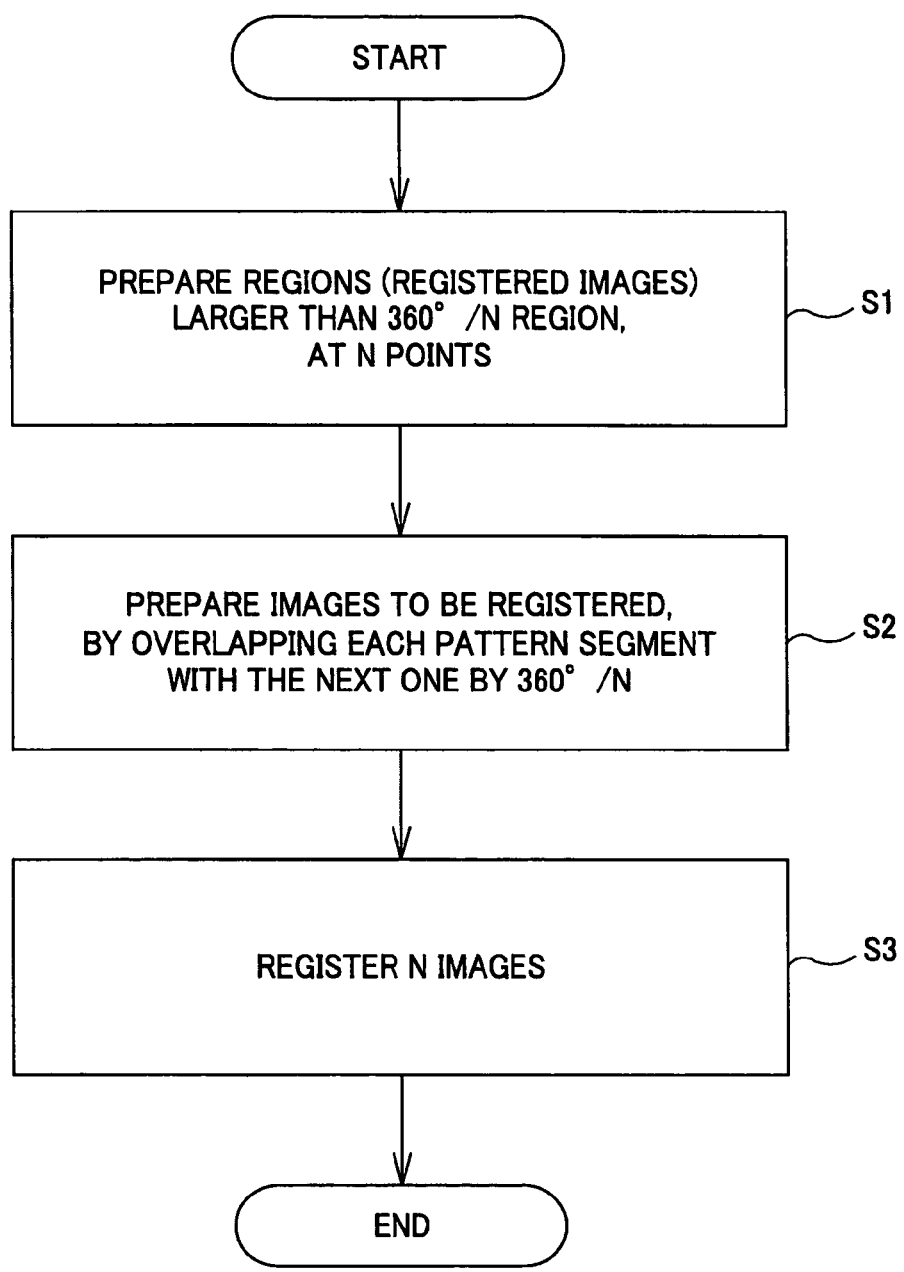
FIG. 5 is a flowchart for explaining the method of registering an image generated from the pattern data obtained by the direction-recognizing apparatus.

FIG. 5 is a flowchart for explaining the method of registering an image generated from the pattern data. First, a pattern of the type shown in FIG. 2 is prepared. This pattern is to be printed on the circumferential surface of the pole 100. The pattern is divided into N segments of the same size. More precisely, the pattern is divided into eight segments that are to be printed on the surface segments $S_0$ to $S_7$ of the pole 100, from the point $AC_0$ at intervals of $2\pi R_P/N$ (i.e., the arc of pole segment whose central angle is 360°/N). Pattern segments $AR_N$ broader than the segments to be printed on the surface segments $S_0$ to $S_7$ are extracted from the pattern (Step S1). The pattern segments $AR_N$ have a greater area than the pattern segments to be printed on the surface segments $S_0$ to $S_7$. Of these pattern segments $AR_N$, the segment including the pattern segment $S_2$ that is located at point $AC_2$ and which is to be printed on the surface segment $S_2$ is registered for recognizing the direction assigned to the surface segment $S_2$.

In the expanded pattern shown in FIG. 2, each direction-data item is assigned to one sector-shaped region $AP_N$ that has a sector-shaped cross section having a central angle of 45°. Hence, one direction-data item corresponds to, for example, the surface segment $S_2$. On the other hand, the pattern segments $AR_2$ used to recognize the direction assigned to the surface segment $S_2$ includes the pattern segment printed on the surface segment $S_2$. Namely, the pattern segments $AR_2$ is therefore broader than the surface segment $S_2$. The pattern segments $AR_2$ is used as registered image view 2.

Similarly, the pattern segments $AR_3$, which overlaps the right part of the pattern segments $AR_2$ and has a central angle of 150°, is extracted and used as registered image view 3. Further, other broad pattern segments $AR_N$ are extracted in a similar manner, each overlapping the preceding one for a distance that corresponds to half the arc defined by the central angle of 45°. Thus, the images view N to be registered are prepared (Step S2).

Figure 6:
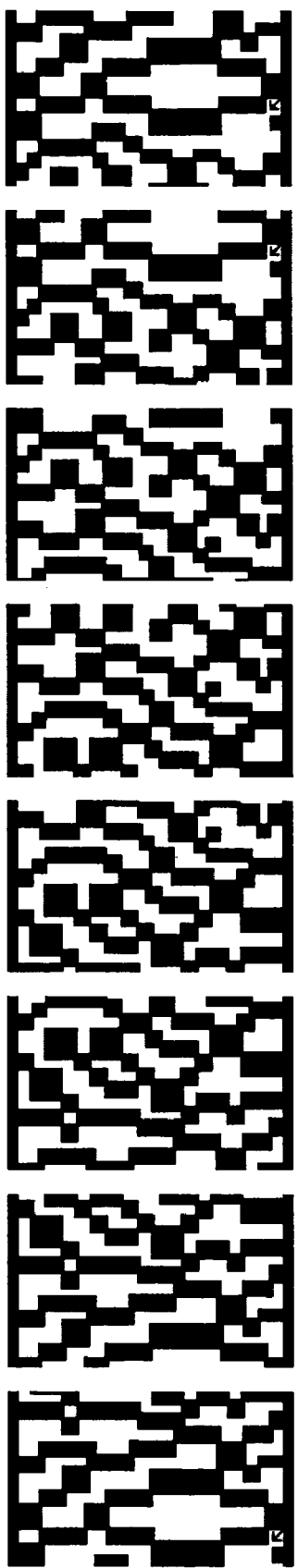
FIG. 6 is a diagram showing various images registered in the case where the divisor N is 8.

N pattern segments $AR_N$ thus extracted are registered as images view N. FIG. 6 is a diagram showing these images view N registered, where N=8. As seen from FIG. 6, eight images view N are registered as images, which are to be used to recognize eight directions, respectively. Each image registered consists of a middle center part $S_N$ and two side parts. Each side part overlaps one side part of an adjacent image. Eight direction-data items are assigned to the eight images view N. They represent 0°, 45°, 90°, 135°, 180°, 225°, 270° and 315°, respectively. Namely, these direction-data items are registered in the image database 112. As mentioned earlier, the images view N thus registered are unique pattern segments, each being a direction-data item (i.e., direction indicator). Any image that the photographing unit 111 has photographed contains the images of some pattern segments printed on the pole 100. The pattern segments photographed are compared with the images view N registered in the database 112. Hence, they can be identified with some of the registered images view N, which are more similar to them.

The pattern segments $AR_N$ to be registered may be extracted from the pattern data that represents the pattern printed on the pole 100, which is illustrated in FIG. 2. Alternatively, they may be obtained from a photograph of the pattern that is printed on the pole 100.

Figure 7:
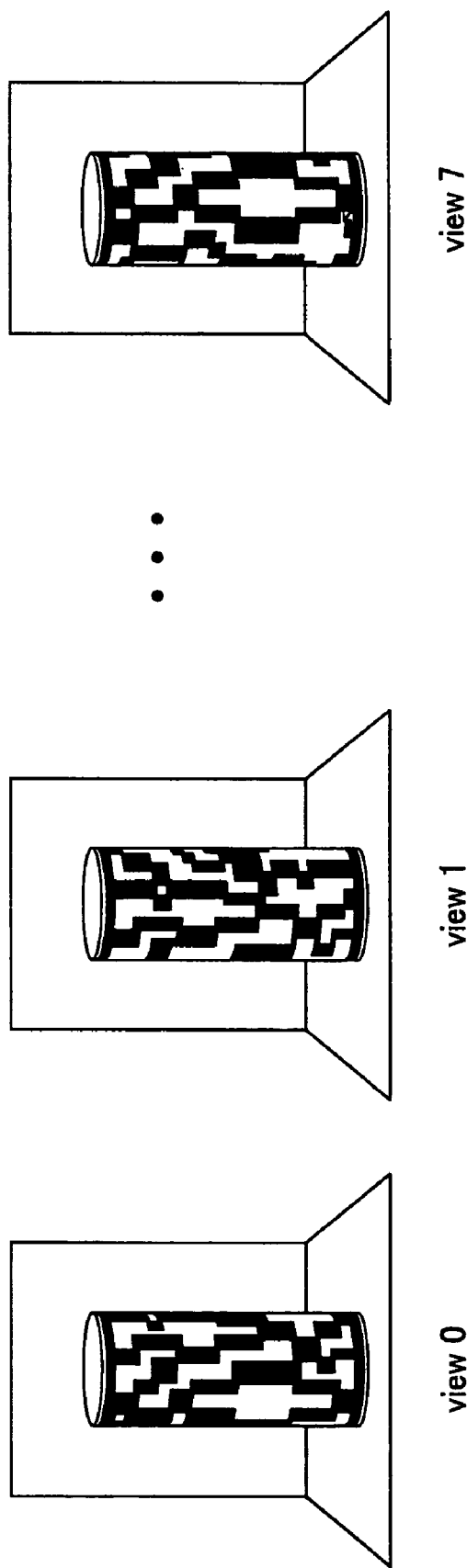
FIG. 7 is a diagram illustrating registered images of the pole, which have been photographed on the same background and which represent the pattern printed on the pole.

In Steps S1 and S1, i.e., steps of preparing pattern segments $AR_N$ that are to be registered in the database 112, the pole 100 is photographed by using the photographing means (e.g., camera) incorporated in the robot apparatus 1. More specifically, the pole 100 is rotated at angular intervals of 45°. Every time the pole 100 is rotated by 45°, the photographing means of the robot apparatus 1, which incorporates the direction-recognizing apparatus 110, takes a picture of the pole 100. Thus, images view N are prepared, which are to be registered in the database 112. In the images view N thus prepared may include the background. In view of this, the pole 100 is placed in front of a wall that makes a plain background having no patterns at all, as shown in FIG. 7. Then, the pole 100 is rotated at angular intervals of 45° and photographed, thus providing images view 0, view 1, . . . view 8 that will be registered. In this case, it is desirable to photograph the pole 100 several times, each time in the same condition.

The pole 100 may be photographed from the same direction in different conditions, thus obtaining various images of the same pattern segment. If these images are registered in the database 112, the orientation of the robot apparatus 1 can be determined at high robustness even if the environmental condition of the pole 100 changes. For example, the lighting condition may change from time to time. If so, the image of the pole 100, photographed in one lighting condition, can hardly be identified with the registered image photographed in another lighting condition. This is why it is desired that the pole 100 be photographed several times, each time at a different angular position and in the same lighting condition, thus providing several images. These images of the pole 100, thus photographed, are registered as a group of images, in the database 112.

Figure 8A:
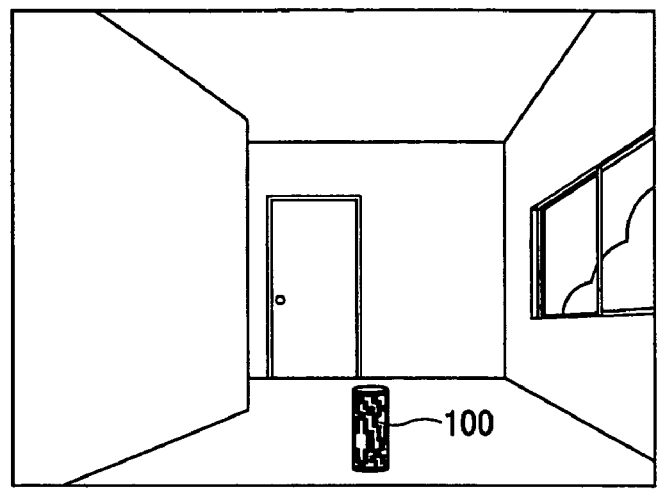
FIGS. 8A to 8C show N number of images of different scenes, each showing the image of the pole located at the same position.
Figure 8B:
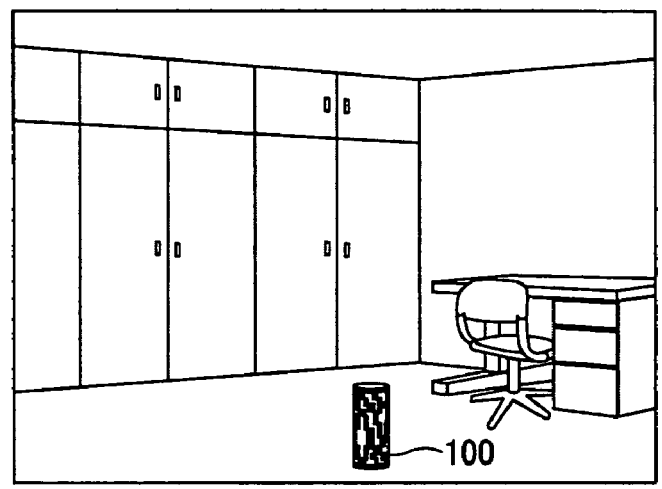
Figure 8C:
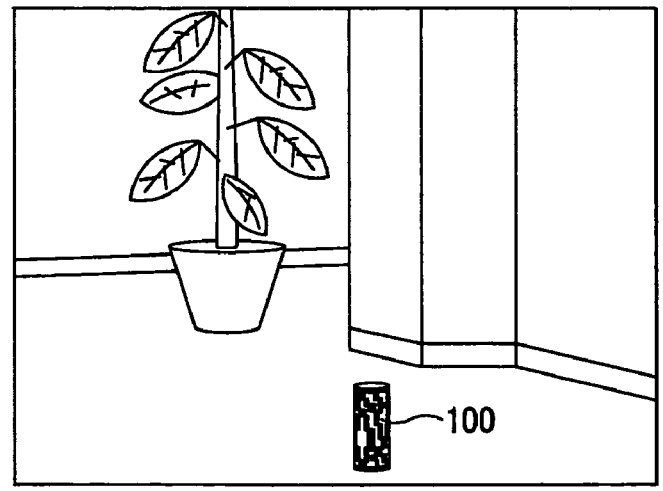

If several groups of such images, each group for one pattern segment, are registered, the direction from which the pole 100 is photographed in any condition can be recognized. Moreover, the pole 100 used to determine the orientation of the robot apparatus 1 may be located with different backgrounds as is illustrated in FIGS. 8A, 8B and 8C. The image of the pole 100 may hardly distinguished from that of the background in some conditions. To prevent this, the images of some different backgrounds may be registered in the database 112, in order to determine the orientation of the robot apparatus 1 at high robustness.

To be more specific, the pole 100 is placed in front of a white wall and photographed, and then placed in front of a black wall and photographed. Thus, two images are photographed, which are registered in the database 112. In addition, the pole 100 are photographed with such different backgrounds as shown in FIGS. 8A, 8B and 8C, and the resultant three images are registered in the database 112.

Furthermore, several images of the pole photographed from the same angle and at different distances may be registered in the database 112. Then, the orientation of the robot apparatus 1 can be determined at high accuracy, regardless of the distance between the robot apparatus 1 and the pole 100. This makes it possible to determine the orientation of the apparatus 1, no matter how far the apparatus 1 is from the pole 100.

As described above, the pattern printed on the circumferential surface of the pole 100 is a geometrical one that has no periodicity. Nevertheless, a pole having a non-geometrical pattern may be used instead, only if the non-geometrical pattern can be divided into N segments that can be distinguished from one another. In this case, too, the direction-recognizing apparatus 110 can recognize N directions indicated by the images photographed of the N pattern segments.

The direction-recognizing apparatus 110 will be described, referring to FIG. 4 again. The image-recognizing unit 113 extracts from the database 112 any image that is identical or similar to the image of the pole 100 photographed. The image-recognizing unit 113 may be an image-recognizing apparatus disclosed in, for example, Jpn. Pat. Appln. No. 2003-124525. The unit 113 has a characteristic-extracting section, a characteristic-data holding section, a characteristic-comparing section, and an image-inferring section. The characteristic-extracting section extracts the characteristics of each image registered in the database 112. The characteristic-data holding section holds data items representing the characteristics extracted by the characteristic-extracting section, and also the position-data items representing the positions where the characteristics exist. The characteristic-comparing section calculates the similarity or dissimilarity between the characteristics of a photograph with those represented by data items held in the characteristic-data holding section. The comparing section then selects a pair of characteristics that are most similar to two characteristics of the photograph. The image-inferring section detects the registered image that is identical to the image of the pole, which is contained in the input image.

The characteristic-comparing section compares each characteristic of the input image with the corresponding characteristic of every image registered. More precisely, this section cyclically shifts the density-gradient histograms of one of the characteristics compared, while not shifting the density-gradient histogram of the other characteristic, thereby finding the distance between the histograms. As a result, various inter-histogram distances are obtained. Then, two characteristics, for which the shortest distance is shorter than a predetermined threshold value, are used as candidates for the above-mentioned pair of most similar characteristics.

Using the candidates for the pair of most similar characteristics, the image-inferring section determines whether the input image contains the image of the pole 100 photographed. Hence, the image-recognizing unit 113 can identify the input image even if the image of the pole 100, contained in the input image, is larger than, or somewhat deformed from, the image registered in the database 112. The image-recognizing unit 113 will be described later in more details.

The direction-recognizing unit 114 of the direction-recognizing apparatus 110 determines the orientation of the robot apparatus 1, from the direction-data item associated with the image-data item extracted by the image-recognizing unit 113. Only one of the registered images view N may be found identical or similar to the image of the pole 100 photographed. If this is the case, the direction-recognizing unit 114 outputs the direction-data item associated with this registered image.

Two or more registered images view N may be found identical or similar to the image of the pole 100 photographed. In this case, the direction-recognizing unit 114 outputs some direction-data items that have been selected from those registered in the database 112, in accordance with pre-scribed rules. The registered images view 0 to view 7 illustrated in FIG. 6 are pattern data items, some of which represent a pattern segment printed on a surface segment $AS_N$ that has a central angle of 150°. Note that each registered image view N overlaps the adjacent registered images. Therefore, the input image photographed of the pole 100 may be identified as two or more registered images view N in some cases. For example, when the input image photographed contains the images of the pattern segments printed on the pole 100 and existing in the sector-shaped regions $AP_2$ and $AP_3$, the input image may be identified as the registered images view 2 and view 3. Further, when the input image contains the images of the pattern segments existing in the sector-shaped regions $AP_1$, $AP_2$ and $AP_3$, the input image may be identified as the registered images view 1, view 2 and view 3.

Of the registered images that are considered to be the input image, the one most similar to the input image is selected as identical to the input image. The direction-data item associated with the registered image so selected is then output. Alternatively, some of the registered images, whose similarities to the input image are above a predetermined value, may be selected. In this case, the direction-data items associated with the registered images thus selected are weighted differently according to their similarities and then selected and output.

An odd number of registered images (for example, three registered images) may be considered to be identical to the input image. In this case, the direction-data item associated with the middle registered image is selected and output. An even number of registered images (for example, two registered images) may be considered to be identical to the input image. If so, the direction-data item associated with the middle registered image is selected and output. In this case, 2×N directions can be recognized from the N image registered in order to recognize N directions.

The pole 100, which is used as direction-indicating member, may be located at the power-charging station which are installed for the robot apparatus 1 or at a similar facility. If the pole 100 is located at the power-charging station, the robot apparatus 1 has the data representing the position that the station assumes with respect to the pole 100. The robot apparatus 1 can therefore recognize the size of the pole 100 as compared with the input image and the distance from a distance sensor or the like to the pole 100. Moreover, the robot apparatus 1 can recognize in which direction the pole 100 exists. Based on the size of the pole 100, the distance and the direction, thus recognized, the robot apparatus 1 determines the best possible route in which it should walk, approaching the power-charging station to acquire power.

Assume that the power-charging station is located in the sector-shaped region $AP_0$ so that the robot apparatus 1 incorporating the direction-recognizing apparatus 110. Then, the robot apparatus 1 compares the input image of the pole 100 with the images registered in the database 112 and selects the registered image identical to the input image of the pole 100. The apparatus 1 can therefore determine in which direction the station stands with respect to the pole 100. Thus, the robot apparatus 1 can acquire the direction data that shows that it is now in, for example, the sector-shaped region $AP_2$. In this case, the robot apparatus 1 can turn around clockwise through 90°.

As specified above, eight direction-data items are assigned to eight surface segments $S_0$ to $S_7$. For example, the direction-data item assigned to the surface segment $S_1$ is 45°, and the direction-data item assigned to the surface segment $S_2$ is 90°. In addition, various actions that the robot apparatus 1 may make may be assigned to the direction-data items. One of these actions is, for example, a 90'-turn in clockwise direction.

The robot apparatus 1 can determine the best possible route it should take, from the direction-data item acquired from the input image of the pole 100 and the direction in which it should walk. The robot apparatus 1 therefore looks intelligent.

Figure 9:
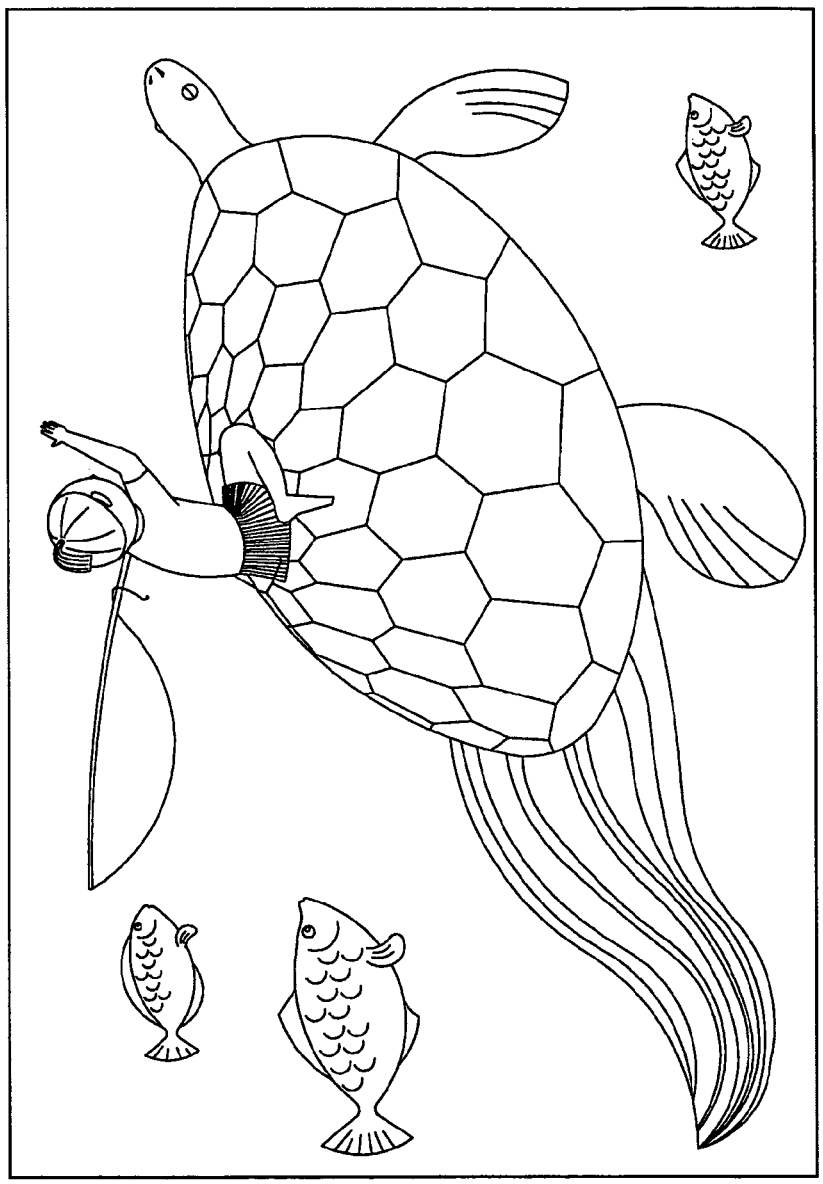
FIG. 9 depicts another pattern that may be printed on the circumferential surface of the pole.

The present invention is not limited to the embodiment described above. Various changes and modifications can of course be made, without departing from the spirit and scope of the invention. The above-described embodiment uses the geometrical pattern of FIG. 2, which has no periodicity. Nonetheless, such an illustration as shown in FIG. 9 may be printed on the circumferential surface of the pole 100. Alternatively, a text or the like may be printed on the pole 100. Any pattern may be printed on the pole 100 if it enables the direction-recognizing apparatus 110 to recognize the orientation of the robot apparatus 1, in whichever direction the pole 100 is photographed by the camera that is incorporated in the apparatus 1.

As specified above, the input image photographed by the camera is compared with the images registered for facilitating the recognition of directions, thereby to detect an object. To achieve this, the pole 100 having the pattern shown in FIG. 2 may be replaced by a member that enables the direction-recognizing apparatus 110 to recognize the orientation of the robot apparatus 1. A member having projections on its surface or depressions in its surface can be used. The pole 100, which has a circular cross section, can be replaced by a prism having a polygonal cross section, such as triangular, rectangular or pentagonal cross section. A bar having a semicircular cross section may be used instead, which can be placed on the wall. Further, a pattern for use in recognizing directions may be printed on only that part of the direction-indicating member that can be photographed by the robot apparatus 1.

The pole 100 used in the embodiment described above is one that has a circular cross section. Nevertheless, a member shaped like a cone, a pyramid or a ball may be used instead. Such a direction-indicating member may have a printed pattern that looks different as viewed in different directions, like the Earth map printed on a globe.

In the above-described embodiment, the pole 100 is divided into N segments of the same size. Instead, the pattern may be divided into segments of different sizes, in accordance with the difference in importance between the parts of the pattern.

(2) Image Recognition by the Image-Recognizing Unit

The image-recognizing apparatus disclosed in Jpn. Pat. Appln. No. 2003-124525, which is an example of the image-recognizing unit 113, will be described in detail. This image-recognizing apparatus compares an input image (hereinafter referred to as "object image") containing the image or one or more objects, with a model image that contains the image of a model and extracts the image of the model from the object image. The model corresponds to the registered image described above.

Figure 10:
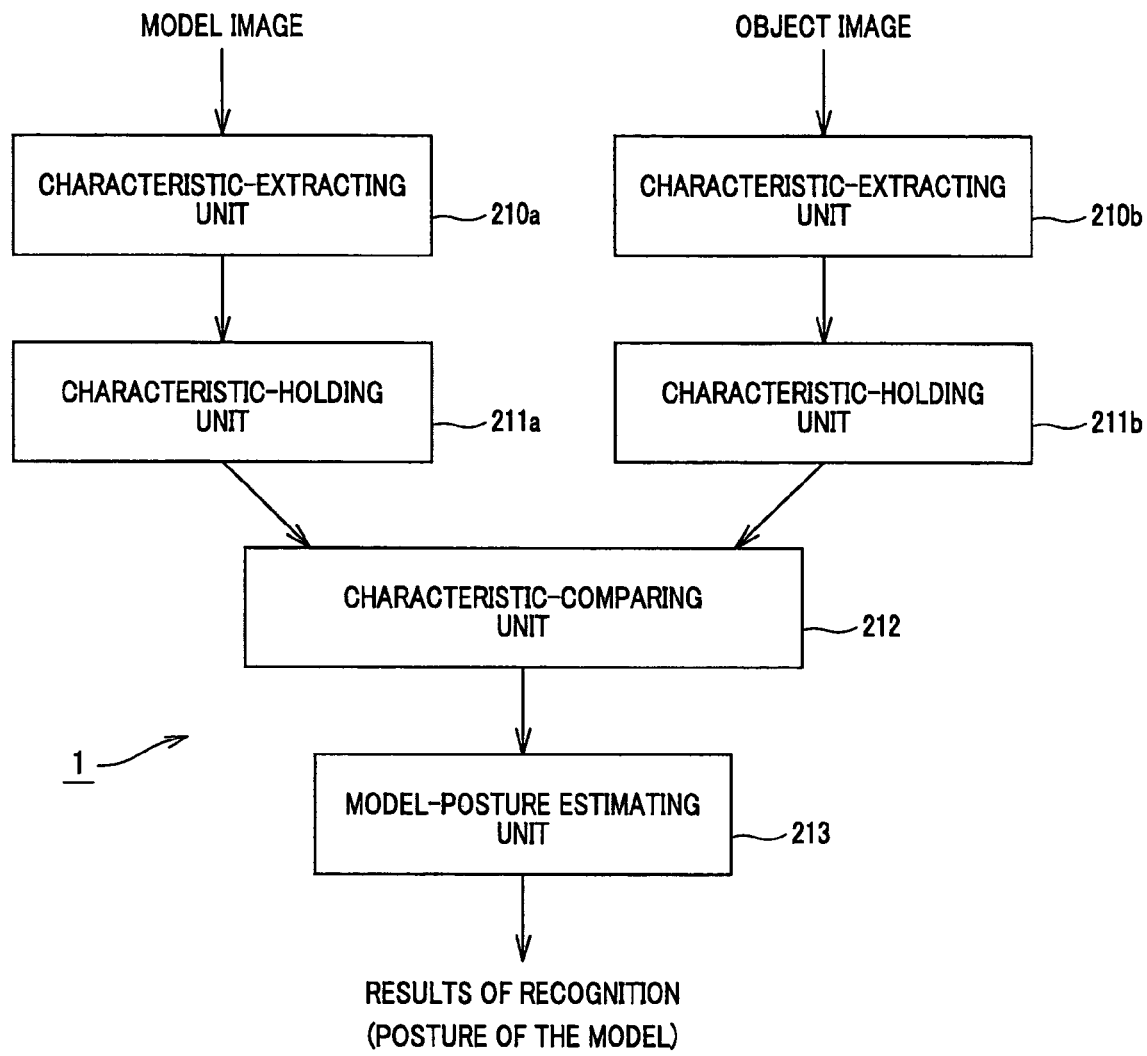
FIG. 10 is a block diagram of an image-recognizing apparatus that is suitable for use in the direction-recognizing apparatus, the apparatus being disclosed in Jpn. Pat. Appln. No. 2003-124525.

FIG. 10 is a block diagram of the image-recognizing apparatus 201. The apparatus 201 has characteristic-extracting units 210a and 210b, characteristic-holding units 211a and 211b, a characteristic-comparing unit 212, and a model-posture estimating unit 213. The characteristic-extracting unit 210a extracts model-image characteristics from a model image. The characteristic-extracting unit 210b extracts object-image characteristics from an object image. The characteristic-holding unit 211a holds the data representing the model-image characteristics extracted by the characteristic-extracting unit 210a. The characteristic-holding unit 211b holds the data representing the object-image characteristics extracted by the characteristic-extracting unit 210b. The characteristic-comparing unit 212 compares the model-image characteristics with the object-image characteristics, generating data that represents the similarity or dissimilarity between the model image and the object image. From the similarity or dissimilarity data, the unit 212 generates model-object characteristic pair (candidate characteristic pair) that represents a model image and an object image that are similar to each other. The candidate characteristic pair is supplied to the model-posture estimating unit 213.

Using the candidate characteristic pair, the model-posture estimating unit 213 determines whether the object image contains any model image. If the object image contains a model image, the unit 213 repeatedly projects the affine transform parameter into a parameter space, the parameter determined by three candidate characteristic pairs selected at random. The affine transform parameter is repeatedly projected, because it is assumed that any model image detected has been deformed by performing affine transformation on the object image. The repeated projection of the affine transform parameter forms clusters of members in the parameter space. The members of the largest cluster are a real characteristic pair (i.e., in-lier). Using the in-lier, an affine transform parameter is obtained by means of least-square estimation. The model-posture estimating unit 213 generates and outputs the data representing the posture of the model. The model-posture is the result of the model recognition.

The configuration of the image-recognizing apparatus 201 will be described in detail. In the following description, the vertical axis and horizontal axis of any image are regarded as X-axis and Y-axis, respectively.

The characteristic-extracting units 210a and 210b perform smoothing filtering and image reduction repeatedly and alternately on the image (model image or object image) from which characteristics should be extracted. A multi-resolution pyramid consisting of images is thereby constructed. The smoothing filtering may be a convolution (Gauss filtering) using a two-dimensional Gauss function of equation (1). The image reduction may be bi-quadric interpolation re-sampling. The factor applied to the re-sampling is $\sigma$, which is used in the Gauss filtering of equation (1).

$$g(x, y) = \frac{1}{2\pi\sigma^2} e^{-(x^2+y^2)/2\sigma^2} \tag{1}$$

Figure 11:
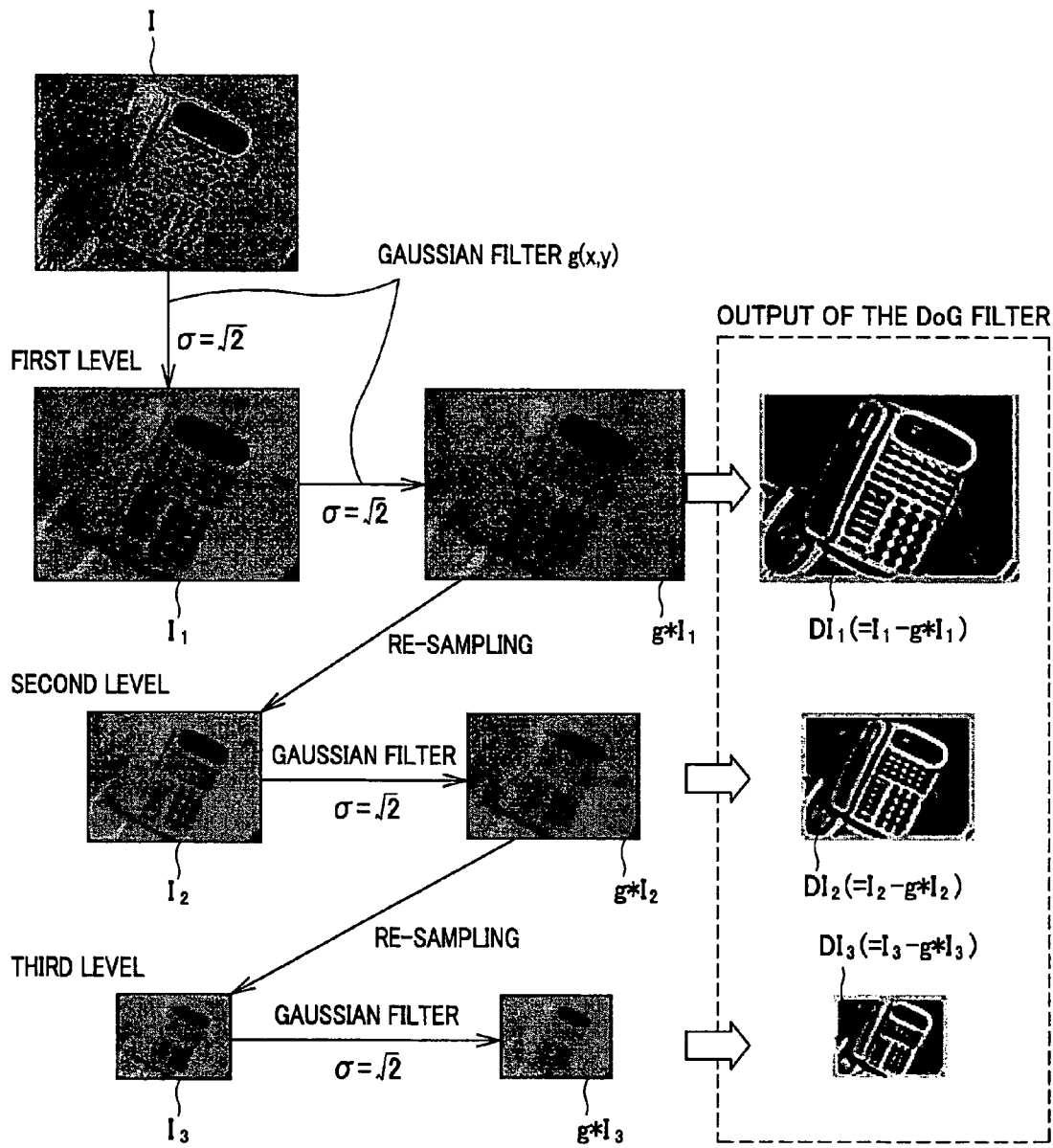
FIG. 11 is a diagram explaining how to construct a multi-resolution pyramid consisting of images that have been provided by the characteristic-extracting unit incorporated in the image-recognizing apparatus.

As FIG. 11 shows, Gauss filtering g(x, y), wherein $\sigma=\sqrt{2}$, is performed on input image I, thereby generating an image $I_1$ of the first level (highest resolution). Further, Gauss filtering is performed on the image $I_1$, thus generating an image $g*I_1$. This image $g*I_1$ is re-sampled and subjected to Gauss filtering, generating images $I_2$ and $g*I_2$, both having the second level. Similarly, images $I_3$ and $g*I_3$ of the third level are generated from the signal $g*I_2$.

Next, in the characteristic-extracting units 210a and 210b, the images of various levels (resolutions) are passed through a DoG (Difference of Gaussian) filter. The DoG filter is a two-dimensional differential filter that is used to intensify the edges of an image. Like the LoG filter (Laplacian of Gaussian) filter, it is often used in a process similar to the process of relaying information from the retina to the outer geniculate body in the human visual system. The DoG filter can easily generate an output by finding the difference between two images output from two Gauss filters. That is, an image $DI_1$ of first level ($=I_1-g*I_1$), an image $DI_2$ of second level ($=I_2-g*I_2$), and an image $DI_3$ of third level ($=I_3-g*I_3$) are obtained.

Then, the characteristic-extracting units 210a and 210b detect the local points (i.e., local minimum and local maximum) in each of the images $DI_1, DI_2, DI_3 \ldots$ at various levels, which have been output from the DoG filter. Of these local points, those which do not change in position in spite of the changes in resolution are output as characteristics. The robust matching of characteristics can therefore be accomplished in the process of expanding and reducing the image.

Figure 12:
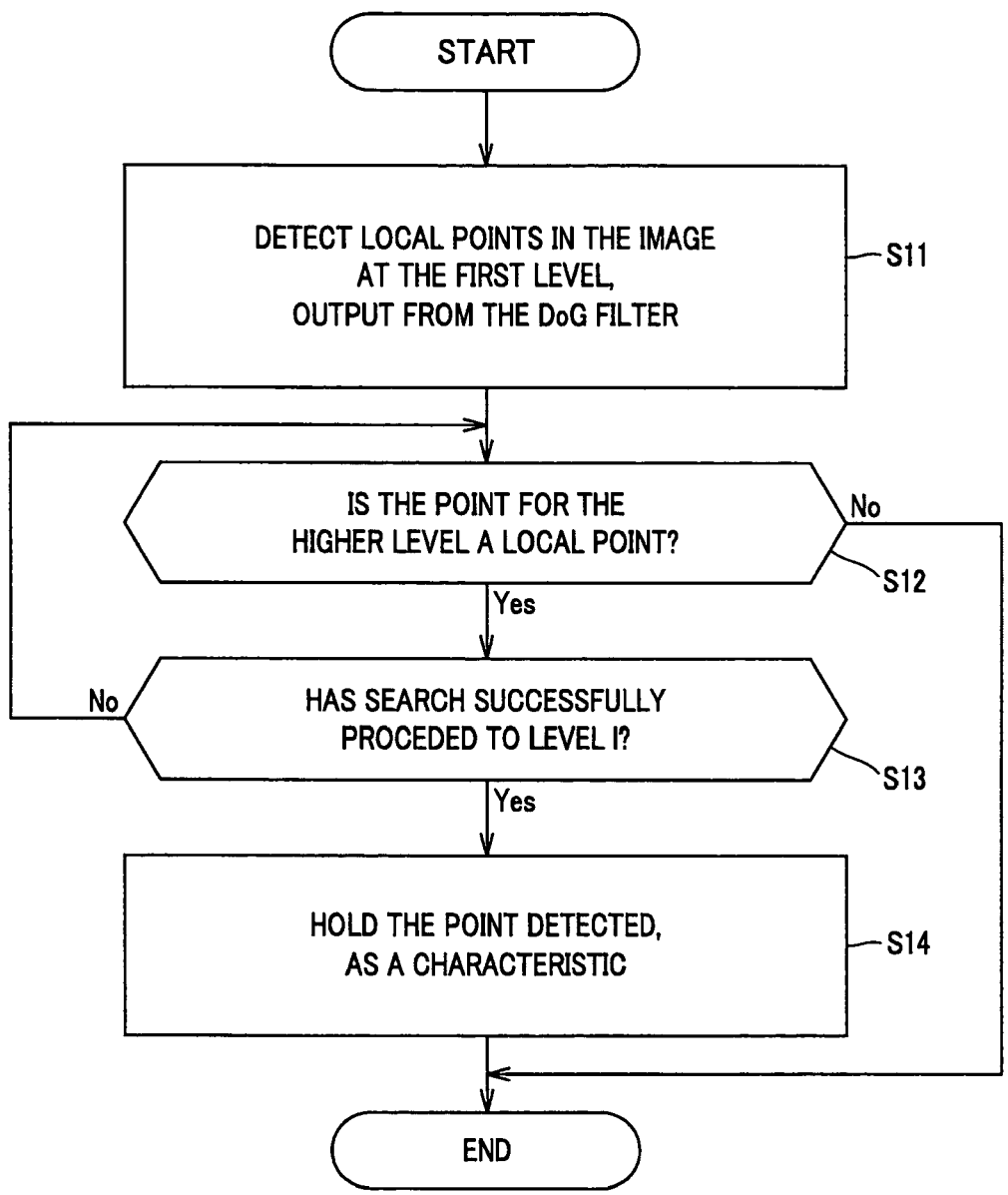
FIG. 12 is a flowchart explaining the process of detecting characteristics that undergo no position changes when the resolution changes to the level L.

The process of detecting characteristics that undergo no changes even if the resolution changes to the level L of a multi-resolution pyramid, that is, to the (L−1)th power of σ, will be described with reference to the flowchart of FIG. 12.

The local points (i.e., local minimum and local maximum) in the image $DI_1$ at the first level (highest resolution) output from the DoG filter are detected in Step S11. Note that the neighborhood region for these local points can be a 3×3 direct region.

In Step S12, the point corresponding to each local point detected, which is at the next higher level (i.e., next lower resolution) is detected from the image reduction that accompanies the decrease of resolution. It is then determined whether the point thus detected is a local point or not. If YES, the operation goes to Step S13. If NO, the search for points is terminated.

In Step S13, it is determined whether the search has successfully proceeded to the level L. If NO, that is, if the search has yet to proceed to the level L, the operation returns to Step S12 and the search is carried out for the higher levels. If YES, that is, if search has successfully proceeded to the level L, the operation goes to Step S14. In Step S14, the point detected is held as a point that indicates a characteristic.

Figure 13:
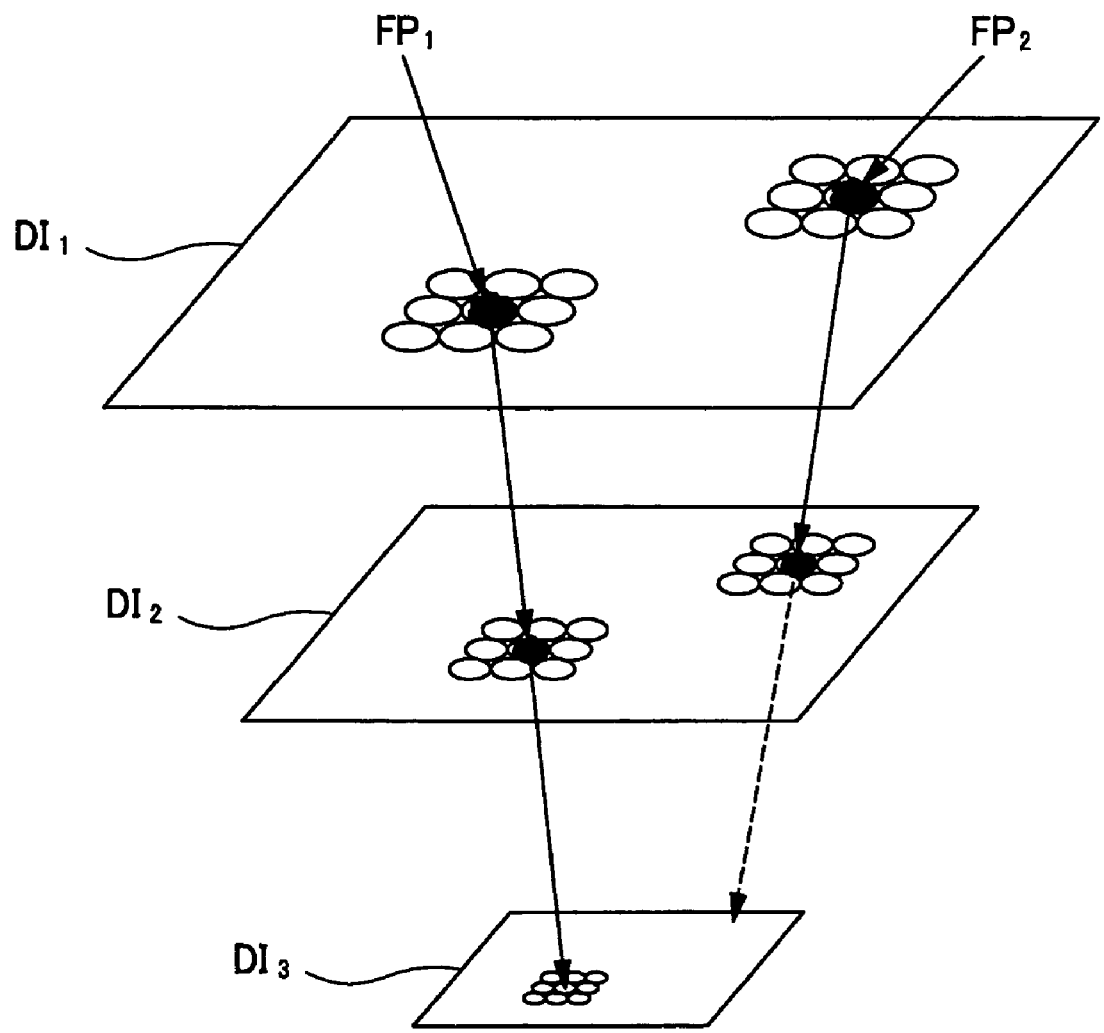
FIG. 13 is a diagram explaining how to detect characteristics that do not change in position when the resolution is lowered to the third level.

The resolution may be changed to the third level in order to detect a point that does not change in position. In this case, the local point $FP_1$ detected in the image $DI_1$ at the first level is regarded as a characteristic as is illustrated in FIG. 13. This is because the local point $FP_1$ corresponds to points at the first, second and third levels. On the other hand, the local point $FP_2$ detected in the image $DI_1$ at the first level, too, is not regarded as a characteristic as shown in FIG. 13, because it corresponds to points at the first and second levels.

The characteristic-extracting units 210a and 210b may use LoG filters, in place of DoG filters. Further, the outputs of the DoG filters may be replaced by the corner-ness functions that are applied to detect the corners of a body as is disclosed in Harris C. and Stephens M., "A combined corner and edge detector," in Proc. Alvey Vision Conf., pp. 147-151, 1988.

The characteristic-holding unit 211a (FIG. 10) receives and holds the data representing the model-image characteristics extracted by the characteristic-extracting unit 210a. The characteristic-holding unit 211b (FIG. 10) receives and holds the data representing the object-image characteristics extracted by the characteristic-extracting unit 210b. The characteristics extracted by either characteristic-extracting unit may be the density-gradient vectors (i.e., intensity and direction of the gradient) at the points near the characteristics that have been derived from the data about the images ($I_1, I_2, \ldots I_L$) at various levels. The gradient intensity Mx,y and the gradient direction Rx,y, both at a point (x, y) are given as:

$$M_{x,y} = \sqrt{(I_{x+1,y}-I_{x,y})^2 + (I_{x,y+1}-I_{x,y})^2} \quad (2)$$

$$R_{x,y} = \tan^{-1}(I_{x,y+1}-I_{x,y}, I_{x+1,y}-I_{x,y}) \quad (3)$$

It is desired that the neighborhood region for a local point be one that is symmetrical with respect to the local point, i.e., a region that undergoes no structural change when it rotates. Therefore, robustness against the change in characteristics due to the rotation of the image can be ensured. One of two alternative methods (i) and (ii) can be employed in the invention. In the method (i), a pixel region having a radius r from a characteristic is used as neighborhood region for a local point. In the method (ii), a two-dimensional Gauss weight is applied to the density gradient, the weight being symmetrical to the characteristics over a distance that is equivalent to width σ.

Figures 14A, 14B:
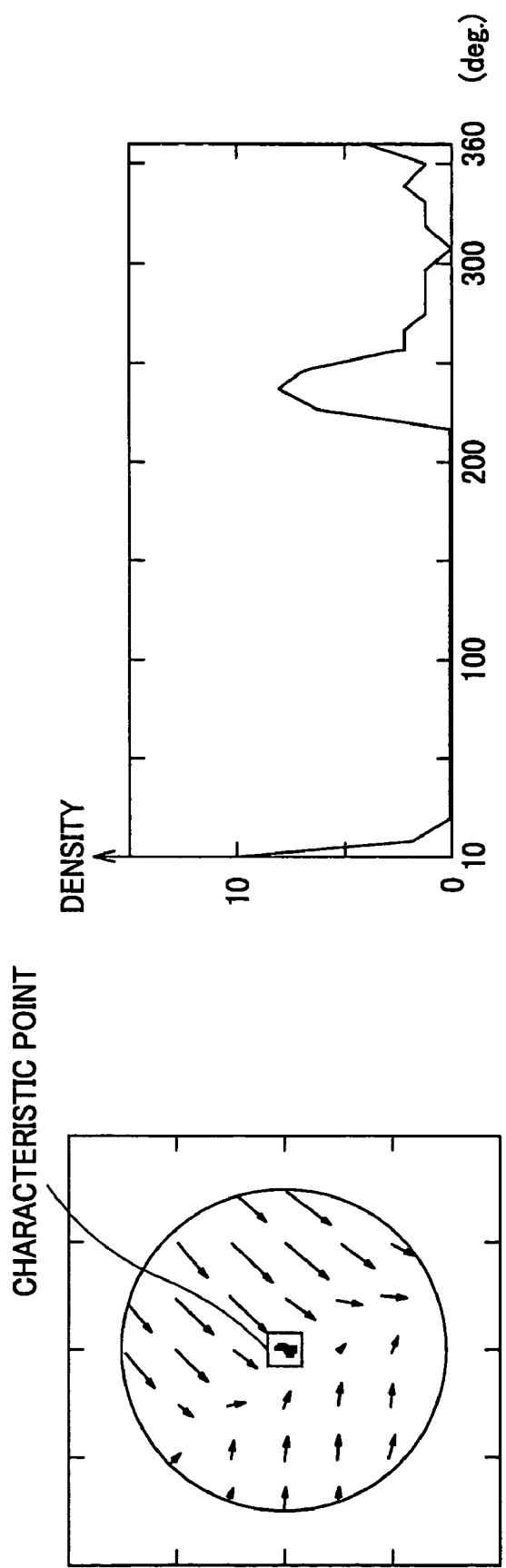
FIG. 14A and FIG. 14B are diagrams explaining the process of the characteristic-holding unit incorporated in the image-recognizing apparatus, FIG. 14A showing density-gradient data for region within a radius of 3.5 pixels from a characteristic point, and FIG. 14B being a histogram generated from the density-gradient data.

FIG. 14A illustrates the density-gradient data for region within a radius of 3.5 pixels from a characteristic point. In FIG. 14A, the length of each arrow indicates the gradient of density, and the direction of each arrow indicates the direction of density.

The characteristic-holding units 211a and 211b hold the histograms (direction histograms) that show the directions of gradient near the characteristics. FIG. 14B is a histogram that is generated from the density-gradient data shown in FIG. 14A. The gradient width Δθ is 10°. The number N of gradients is 36 (=360°/10°).

Next, the characteristic-comparing unit 212 (FIG. 10) compares each model-image characteristics with the corresponding object-image characteristic. It generates data that represents a model-object characteristic pair (candidate characteristic pair).

Figure 15:
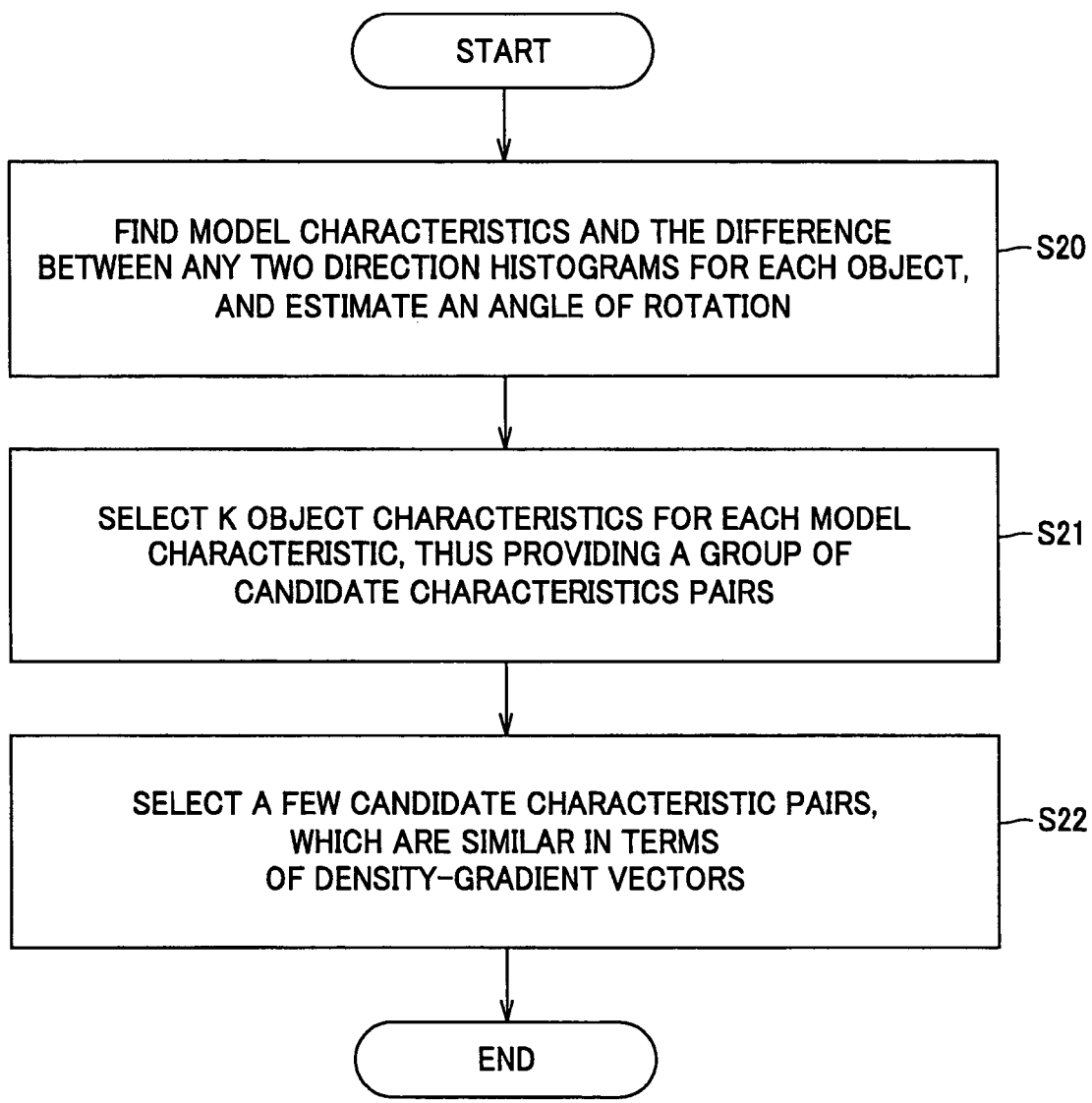
FIG. 15 is a flowchart for explaining, in detail, the process performed by the characteristic-comparing unit provided in the image-recognizing apparatus.

The process that the characteristic-comparing unit 212 performs will be described in detail, with reference to the flowchart of FIG. 15. In Step S20, the unit 212 compares the direction histogram of each model-image characteristic with the direction histogram of the corresponding object-image characteristic, thus calculating the distance between these histograms (i.e., the dissimilarity between the model image and the object image). At the same time, the unit 212 estimates the angle through which the model image and the object image have rotated with respect to each other.

Consider two direction histograms $H_1$ and $H_2$ that are identical in terms of gradient width Δθ and the number N of gradients. Namely, $H_1=\{h_1(n), n=1, 2, \ldots, N\}$, and $H_2=\{h_2(n), n=1, 2, \ldots, N\}$, where $h_1(n)$ and $h_2(n)$ indicate the same degree at gradient n. The distance d ($H_1, H_2$) between the histograms $H_1$ and $H_2$ is expressed by the following equation (4):

$$d(H_1, H_2) = \left(\sum_i \|h_1(i) - h_2(i)\|^r\right)^{1/r} \quad (4)$$

Applying this equation (4), the dissimilarity between each model characteristic histogram and the corresponding object characteristic histogram is calculated. Since the scale ratio between the model and the object is unknown at the time of matching, it is necessary (i) to perform matching between the histogram of each model characteristic and the histogram of the corresponding object characteristic, and (ii) to consider the relative rotation of the model to the object, or vice versa, to achieve the matching.

Assume that the dissimilarity between the direction histogram $HM^{LV}=\{hm^{LV}(n)$, where $n=1, 2, \ldots N\}$ of the model point m at level LV and the direction histogram $Ho^{lv}=\{ho^{lv}(n)$, where $n=1, 2, \ldots N\}$ of the object point o at level LV is calculated. Direction histograms cyclically change when the model image and the object image rotate with respect to each other. In view of this, $ho^{lv}$ is cyclically shifted, each time by one gradient, thus performing the calculation of the equation (4). The minimum value obtained by the calculation is used as the dissimilarity between $Hm^{LV}$ and $Ho^{lv}$. Thus, the angle of rotation of the object characteristic can be estimated from the shift (i.e., the gradient by which $ho^{lv}$ has been shifted) to attain the minimum dissimilarity. This method is known as "histogram crossover method."

The dissimilarity $(HM^{LV}, Ho^{lv(k)})$ is given by the following equation (5):

$$\text{dissimilarity}(H_m^{LV}, H_o^{lv}) = \min_{k=0}^{N-1}(d(H_m^{LV}, H_o^{lv(k)})) \quad (5)$$

where $Ho^{lv(k)}$ is the direction histogram in which $Ho^{lv}$ has been shifted by k gradients.

The angle of rotation, θ (m, LV, o, lv), estimated in the neighborhood region for the object characteristic is defined by the following equation (6):

$$\theta(m, LV, o, lv) = k'\Delta\theta \quad (6)$$

where k' is k in the minimum d $(Hm^{LV}, Ho^{lv(k)})$.

Because of the above-mentioned necessity (i), the direction-histogram dissimilarity (Hm, Ho) between the model characteristic m and the object characteristic o is given by the following equation (7):

$$\text{dissimilarity}(H_m, H_o) = \min_{LV, lv}(\text{dissimilarity}(H_m^{LV}, H_o^{lv})) \quad (7)$$

The characteristic-comparing unit 212 holds the levels LV and lv (hereinafter referred to as "LVm*" and "lvo*," respectively) and the angles of rotation θ (m, LVm*, o, lvo*) estimated for these levels, together with the dissimilarity in inter-histogram distances (Hm, Ho). The levels LVm* and lvo* impart a minimum inter-histogram dissimilarity (Hm, Ho) to each model-object pair that consists of a model characteristic m and an object characteristic o.

In Step S21 (FIG. 15), the characteristic-comparing unit 212 selects, for each model characteristic m, K object characteristics $o_{m1}, o_{m2}, \ldots, o_{mK}$ in the ascending order of histogram correlation, thereby providing candidate characteristic pairs. More precisely, it selects K candidate characteristic pairs $(m, o_{m1}), (m, o_{m2}), \ldots, (m, o_{mK})$ for each model characteristic m. Further, the characteristic-comparing unit 212 holds the data representing the levels $LV_m^*$ and $lvom_k^*$ and the estimated angles θ of rotation (m, $LV_m^*$, o, $lvom_k^*$), which correspond to each candidate characteristic pair.

The candidate characteristic pairs thus obtained for all model characteristics constitute a group of candidate characteristic pairs.

The characteristic-comparing unit 212 does not accumulate gradient intensities for each histogram. It holds the gradient directions only. This accomplishes the matching of characteristics, which is robust to changes in brightness. In this embodiment, the shape of the direction histogram is taken into account, rendering the characteristic matching more stable. Moreover, the embodiment can obtain characteristics (estimated angles of rotation) that are stable two-dimensional data.

In Step S21, K candidate characteristic pairs are selected for each model characteristic m. Instead, the unit 212 may select any pairs that correlate to the direction histogram in a degree lower than a threshold value.

Although the candidate characteristic pairs generated as described above are similar in terms of the direction histogram, they include pairs that differ in the spatial characteristic of density gradient. In view of this, pairs are selected in accordance with their density-gradient vectors, thus updating the candidate characteristic pairs of the group, in the following step, i.e., Step S22 (FIG. 15).

To be more specific, any pair in which the similarity between Um and Uo is less than the threshold value is excluded, thereby updating the candidate characteristic pairs of the group. Here, Um is the density-gradient vector at level LVm* for the model characteristic m. And Uo is the density-gradient vector at level $lvom_k^*$ for the object characteristic o that makes a pair with the model characteristic m.

Figure 16:
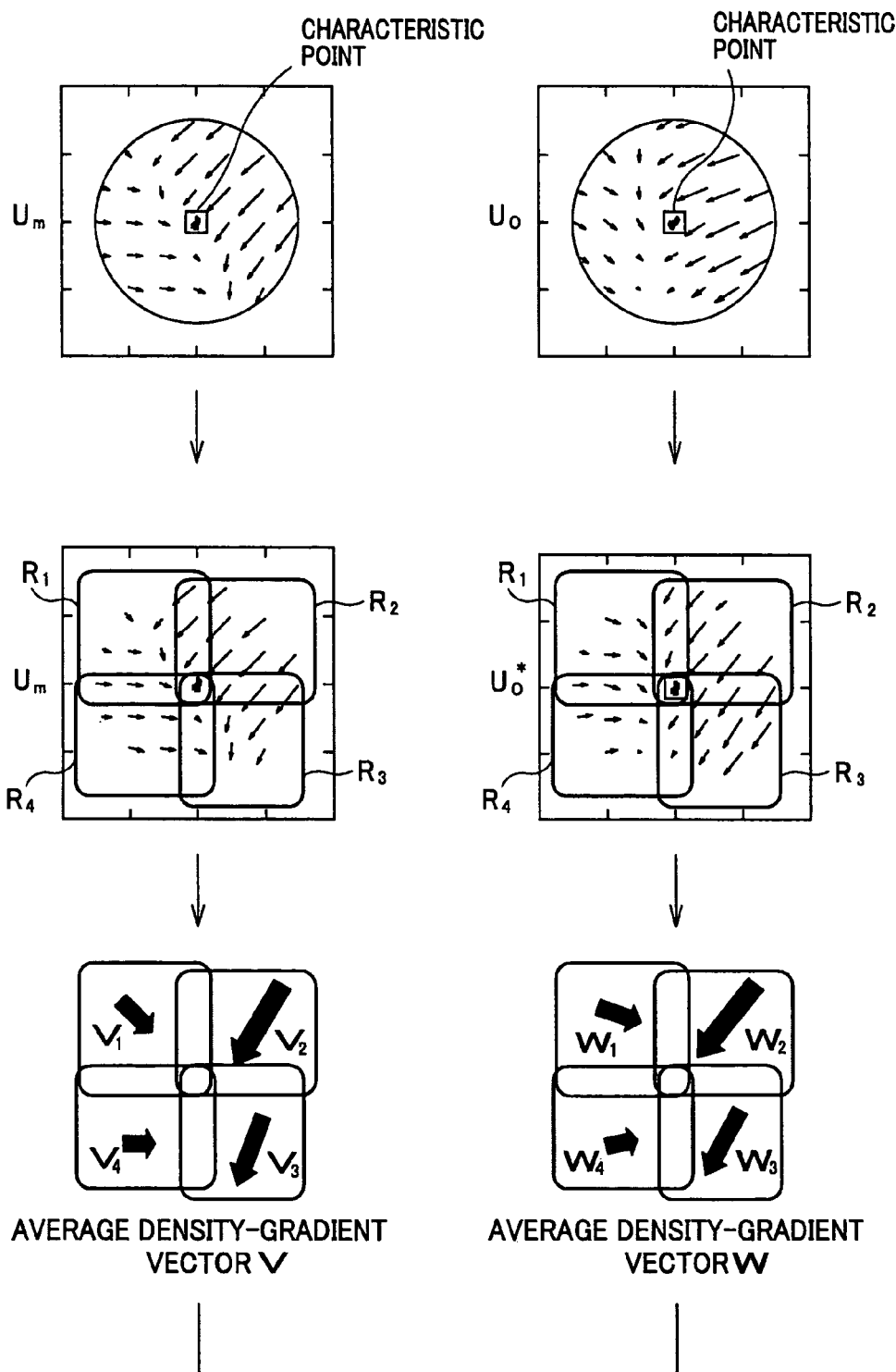
FIG. 16 is a diagram for describing the method of calculating the similarity between density-gradient vectors Um and Uo.

With reference to FIG. 16, the method of calculating the similarity between the density-gradient vectors Um and Uo will be described. First, Um is spatially divided into four regions Ri (i=1, 2, ... 4), and average density-gradient vectors <Vi> (i=1, 2, ... 4) is obtained for each region. The vectors <Vi> are combined, forming an eight-dimensional vector <V>. This vector <V> represents Um. To achieve the matching of density-gradient data items, the gradient direction of Uo is corrected by using the estimated angles θ of rotation (m, $LV_m^*$, o, $lvom_k^*$) already obtained. As a result, Uo* is obtained. At this time, bi-quadric interpolation is carried out to determine the value for the midpoint. Like Um, Uo* is divided into four regions Ri (i=1, 2, ... 4). Then, average density-gradient vectors <Wi> (i=1, 2, ... 4) is obtained for each region. The vectors <Wi> are combined, forming an eight-dimensional vector <W>. This vector <W> represents Uo. The similarity between Um and Uo, (Um, Uo)ϵ[0, 1], is interpreted as the similarity between the average density-gradient vectors <V> and <W>. (Um, Uo)ϵ[0, 1] can be obtained by applying, for example, a cosine correlation value, as described in the following equation (8):

$$\text{similarity}(U_m, U_o) = \frac{1}{2}\left(\frac{(V \cdot W)}{\|V\|\|W\|} + 1\right) \quad (8)$$

where V is <V>, and W is <W>.

The characteristic-comparing unit 212 obtains the similarity between the average density-gradient vectors, as described in equation (8). It excludes, from the group, any candidate characteristic pair in which the similarity is less than δ, thereby updating the group of candidate characteristic pairs.

Thus, the characteristic-comparing unit 212 uses the average density-gradient vector for each region, comparing the characteristics. The character matching is therefore robust to the subtle difference between the positions of characteristics or between the estimated angles of rotation and the changes of the density-gradient data, which results from changes in the brightness.

The above-described process can extract a group of candidate characteristic pairs (each consisting of a model characteristic and an object characteristic) that are similar in terms of the local density gradients at the characteristic. As viewed macroscopically, the group of characteristic pairs, thus obtained, inevitably contains pseudo-characteristic pairs (out-liers) contradicting the posture (model posture) that a model takes in the object image.

If there are three or more candidate characteristic pairs, an approximate affine transform parameter can be estimated by least-square estimation. Any pair that is contradictory in terms of the relation between the estimated model posture and the spatial position, can be excluded. The model posture can then be recognized if it is repeatedly estimated by using the model posture remaining pairs.

However, many out-liers exist in the pair of candidate characteristic pairs, or there may be an out-lier greatly departing from the real amine transform parameter. If this is the case, the least-square estimation is not a satisfactory method, as is known in the art (se Hartley R., Zisserman A., "Multiple View Geometry in Computer Vision," Chapter 3, pp. 69-116, Cambridge University Press, 2000). This is why the model-posture estimating unit 213 (FIG. 10) first extracts the real character pair (in-lier) from the candidate characteristic pairs in accordance with their spatial positional relation, under the restriction of the affine transform. Then, the model-posture estimating unit 213 uses the real character pair to estimate the model posture (i.e., affine transform parameter that determines the distance of parallel motion, angle of rotation, expansion or contraction, and stretch).

The process that the model-posture estimating unit 213 carries out will be explained. As pointed out above, no affine transform parameters can be estimated unless three or more candidate character pairs are available. Hence, if there are only two or less candidate characteristic pairs, the unit 213 determines that the object image contains no model or that the model posture has not been detected. Then, the unit 213 outputs the data showing that model posture cannot be recognized, and stops performing the process. If there are three or more candidate characteristic pairs, the model-posture estimating unit 213 determines that the model posture can be detected. In this case, the unit 213 estimates affine transform parameters. Note that the unit 213 is designed to estimate the model posture from the spatial positions of the characteristics of both the model image and the object image that are at the first level (i.e., the highest resolution).

The affine transform of a model characteristic $[x\ y]^T$ to an object characteristic $[u\ v]^T$ can be given by the following equation (9):

$$\begin{bmatrix} u \\ v \end{bmatrix} = \begin{bmatrix} a_1 & a_2 \\ a_3 & a_4 \end{bmatrix} \begin{bmatrix} x \\ y \end{bmatrix} + \begin{bmatrix} b_1 \\ b_2 \end{bmatrix} \quad (9)$$

In the equation (9), $a_i$ (i=1, 2, ..., 4) is a parameter that determines the rotation, expansion or contraction, and stretch, $[b_1\ b_2]^T$ is a parallel-motion parameter. There are six affine transform parameters $a_1, \ldots, a_4, b_1$ and $b_2$ that should be determined. These affine transform parameters can be determined only if three candidate characteristic pairs are available.

Assume that there is available a group <P> that consists of three candidate characteristic pairs ([x1 y1]$^T$, [u1 v1]$^T$), ([x2 y2]$^T$, [u2 v2]$^T$) and ([x3 y3]$^T$, [u3 v3]$^T$). Then, the relation between the pair group <P> and the affine transform parameter to be determined can be expressed by the following equation (10):

$$\begin{bmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \end{bmatrix} \begin{bmatrix} a_1 \\ a_2 \\ a_3 \\ a_4 \\ b_1 \\ b_2 \end{bmatrix} = \begin{bmatrix} u_1 \\ v_1 \\ u_2 \\ v_2 \\ u_3 \\ v_3 \end{bmatrix} \quad (10)$$

The equation (10) can be rewritten to <A><x>=<b>. Thus, a solution of least-square estimation for the affine transform parameter <x> is given by the following equation (11):

$$x = A^{-1}b \quad (11)$$

where x, A and b are <x>, <A> and <b>, respectively.

The pair group <P> is repeatedly selected so that at least one out-lier may enter it from the group of candidate characteristic pairs. Then, the affine transform parameters are dispersed and projected at random into the parameter space. On the other hand, if a pair group <P> that consists of in-liers only is repeatedly selected at random, the affine transform parameters of the this group will be extremely similar to the real affine transform parameters for the model posture. In other words, the affine transform parameters are close to one another in the parameter space. Hence, if the pair group <P> is selected from groups of candidate characteristic pairs at random and if the affine transform parameter of the group selected is projected into the parameter space, the in-liers will form a cluster in the parameter space. The cluster has a high density (that is, it is composed of many members). This means that the out-liers are dispersed, one far apart from any other. Namely, clustering is effected in the parameter space, and the cluster having more members than any other is composed of in-liers.

Figure 17:
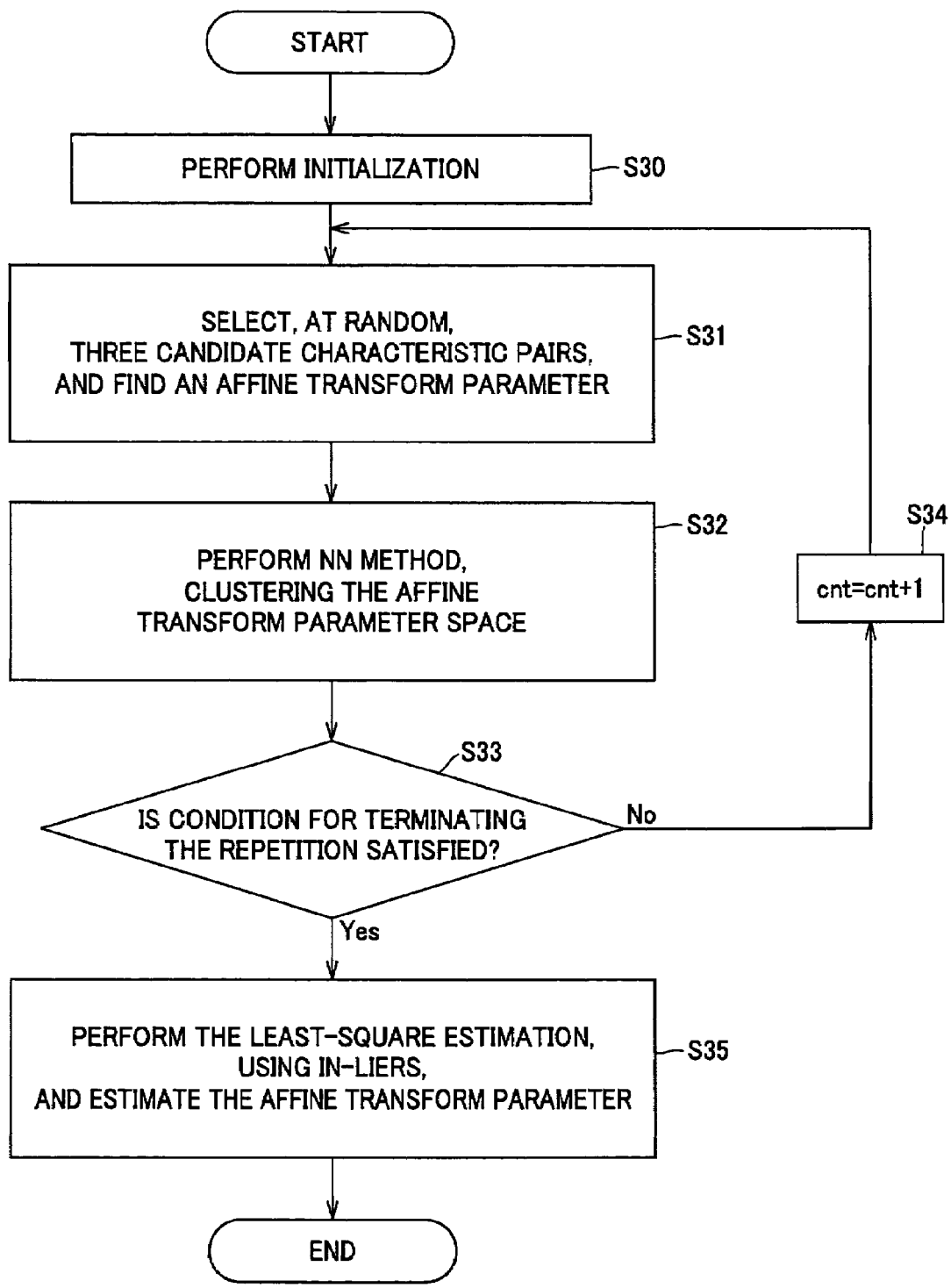
FIG. 17 is a flowchart for explaining the process the model-posture-inferring unit performs in the image-recognizing apparatus.

The process the model-posture estimating unit 213 performs will be described in detail, with reference to the flowchart of FIG. 17. Assume that the unit carries out the clustering by using the NN (Nearest Neighbor) method. Note that $b_1$ and $b_2$ may be various values, depending on the image that should be recognized. In the space of the affine transform parameter <x>, too, the threshold value for the clustering depends on the image to be recognized. This is why the model-posture estimating unit 213 performs the clustering only in the parameter space defined by affine transform parameters $a_1, \ldots, a_4$, (hereinafter collectively referred to as "<a>"). The unit 213 performs this clustering on the assumption that there is no pair groups <P> that provide similar real parameters $a_1, \ldots, a_4$ but does not provide different parameters $b_1$ and $b_2$. Should any condition rises, in which this assumption cannot hold, the unit 213 can perform clustering in a parameter space defined by $b_1$ and $b_2$, which is independent of the <a> space. The problem can therefore be solved easily.

First, the initialization is performed in Step S30. That is, the model-posture estimating unit 213 sets the count cnt (i.e., the repetition number) at 1 (cnt=1). Next, the unit 213 selects a pair group <P1> from the groups of candidate characteristic pairs and finds the affine transform parameter $a_1$. Further, the unit 213 sets the cluster number N at 1 (N=1). A cluster $C_1$ that has <$a_1$> in the middle is thereby formed in the affine-transform parameter space. In the cluster, the centroid <$c_1$> is set at <$a_1$>, namely, <$c_1$>=<$a_1$>, and the number of members, nc1 is set at 1, that is, nc1=1.

Next, in Step S31, the model-posture estimating unit 213 selects, at random, a pair group <Pcnt> from the groups of candidate characteristic pairs, and finds an affine transform parameter <$a_{cnt}$>.

In Step S32, the model-posture estimating unit 213 performs the NN method, clustering the affine transform parameter space. More specifically, the unit 213 finds the first distance $d_{min}$, i.e., one of the distances between the affine transform parameter <$a_{cnt}$> and the centroids of various clusters $C_i$, in accordance with the following equation (12):

$$d_{min} = \min_{1 \leq i \leq N} \{d(a_{cnt}, c_i)\} \quad (12)$$

If $d_{min} < \tau$, where $\tau$ is a prescribed threshold value (for example, $\tau=0.1$), an affine transform parameter <$a_{cnt}$> is assigned to the cluster $C_i$ that provides $d_{min}$. Then, the centroid <ci> of the cluster $C_i$ is updated by using all members including <$a_{cnt}$>. Further, the number $nc_i$ of members of the cluster $C_i$ is set to $nc_i$+1, forming a new cluster $C_N$+1 whose centroid <$c_N$+1> is <$a_{cnt}$> in the affine transform parameter space <a>. Thus, the number of members of the new cluster is therefore $nc_N$+1.

In Step S33, it is determined whether the condition for terminating the repetition is satisfied or not. The condition is one of the following two alternatives. First, the largest number of members exceeds a predetermined value (e.g., 15) and the difference between the largest number and the second largest number (of members) exceeds a predetermined threshold (e.g., 3). Second, the count cnt of the repetition counter exceeds a predetermined threshold value (e.g., 5000). If the condition for terminating the repetition is not satisfied (if No), the count cnt is changed to cnt+1(cnt=cnt+1) in Step S34, and the operation returns to Step S31. If the condition for terminating the repetition is satisfied (if Yes), the operation goes to Step S35.

In Step S35, the model-posture estimating unit 213 performs the least-square estimation using the in-liers obtained in the above-described process. Thus, the unit 213 estimates the affine transform parameter defines the posture of the model.

Assume that in-liners $[x_{IN1} \; y_{IN1}]^T$, $[u_{IN1} \; v_{IN1}]^T$, $[x_{IN2} \; y_{IN2}]^T$, $[u_{IN1} \; v_{IN1}]^T$, ... have been obtained. Then, a linear system expressed by the following equation (13) can provide the relation between the in-liners and the affine transform parameters:

$$\begin{bmatrix} x_{IN1} & y_{IN1} & 0 & 0 & 1 & 0 \\ 0 & 0 & x_{IN1} & y_{IN1} & 0 & 1 \\ x_{IN2} & y_{IN2} & 0 & 0 & 1 & 0 \\ 0 & 0 & x_{IN2} & y_{IN2} & 0 & 1 \\ & & & \ldots & & \\ & & & \ldots & & \end{bmatrix} \begin{bmatrix} a_1 \\ a_2 \\ a_3 \\ a_4 \\ b_1 \\ b_2 \end{bmatrix} = \begin{bmatrix} u_{IN1} \\ v_{IN1} \\ u_{IN2} \\ v_{IN2} \\ \vdots \\ \vdots \end{bmatrix} \quad (13)$$

The equation (13) can be rewritten to $<A_{IN}><x_{IN}>=<b_{IN}>$. Therefore, the solution for the affine transform parameter $<x_{IN}>$ in the least-square estimation is given by the following equation (14):

$$x_{IN} = (A_{IN}^T A_{IN})^{-1} A_{IN}^T b_{IN} \quad (14)$$

where x, A and b represent $<x>$, $<A>$ and $<b>$, respectively.

In Step S35, the model posture determined by the affine transform parameter $<x_{IN}>$ is output as the result of the recognition of the model.

As indicated above, the threshold value τ is a constant. Nonetheless, the threshold value τ may be gradually changed in the course of the repetitive process of Steps S31 to S34. To be more specific, the threshold value τ is first used to acquire coarse in-liers. The threshold value τ is then gradually reduced, every time the process is repeated. Namely, a method that is called "analogous annealing" may be performed. This method can extract in-liers at high precision.

As described above, a process is repeated, in which a group P of pairs is selected from groups of candidate characteristic pairs and the affine transform parameter of the group P is projected into the parameter space. The elements of the largest cluster existing in the parameter space are used as in-liers in the least square estimation, thereby to determine the posture of the model. Instead, the centroid of the largest cluster may be applied as an affine transform parameter in order to determine the posture of the model.

The higher the ratio of the number of out-liers in any candidate characteristic pair group generated by the characteristic-comparing unit 212, the lower the probability of selecting in-liers by the model-posture estimating unit 213. Consequently, the time required for calculating may increase. In such a case, it is desired that as many out-liers as possible be removed from the candidate characteristic pair group input to the model-posture estimating unit 213. To this end, a characteristic-pair selecting unit for selecting candidate characteristic pairs may be provided between the characteristic-comparing unit 212 and the model-posture estimating unit 213 of the image-recognizing apparatus 1. The characteristic-pair selecting unit may select a pair having an estimated angle of rotation that corresponds to the peak of the rotation-angle histogram, from the candidate characteristic pair group generated by the characteristic-comparing unit 212. Otherwise, the characteristic-pair selecting unit may perform the generalization Haff transformation, to select a candidate characteristic pair group that has designated the most popular parameter. The candidate characteristic pair or the pair group, thus selected, is supplied to the model-posture estimating unit 213.

The image-recognizing apparatus and the image-recognizing method, described above, can determine whether the object image contains a model image, by using the candidate characteristic pairs that are similar in characteristics to the object image. If any model image is found in the object image, the posture of the model image is estimated. To estimate the posture of the model image, three candidate characteristic pairs are selected at random, and the affine transform parameter determined by these three pairs is repeatedly projected into the parameter space. As a result, affine transform parameters that pertain to the cluster consisting of more members than any other cluster formed in the parameter space. From these affine transform parameters, one that determines the position and posture of the model image is selected. That is, the affine transform parameter that determines the position and posture of the model image is acquired, not by the least square estimation, but on the basis of the affine transform parameters that pertain to the largest cluster in the parameter space. Hence, the position and posture of the model image can be reliably estimated even if pseudo-characteristic pairs are included in the candidate characteristic pairs.

The image-recognizing apparatus 201, thus configured, performs the matching between any two density-gradient direction histograms that have been obtained from the density gradient data pertaining to a region near a characteristic point. In the matching process, the apparatus 201 finds density-gradient directions and the distance between the two histograms being compared, by cyclically shifting one of the histograms, generating a candidate characteristic pair that consists of two characteristics that are similar in terms of distance. Thus, the gradient intensities of the histograms are not accumulated at all. Only the gradient directions are applied to the matching of the histograms. The matching is therefore robust to changes in brightness. Further, this histogram matching can be reliably accomplished because the shapes of the direction histograms are taken into account. In addition, the histogram matching can provide stable, two-dimensional characteristics (i.e., estimated angles of rotation).

Moreover, the image-recognizing apparatus 201 can detect the target object in accordance with the its density, without recognizing the color of the object image and that of the model image. Therefore, the apparatus 201 would not recognize another object of the same color, as the target object.

(3) Robot Apparatus

An robot apparatus that incorporates the direction-recognizing apparatus described above will be explained. The robot apparatus is a robot that autonomously acts in response to the external stimuli and the internal conditions.

(3-1) Configuration of the Robot Apparatus

Figure 18:
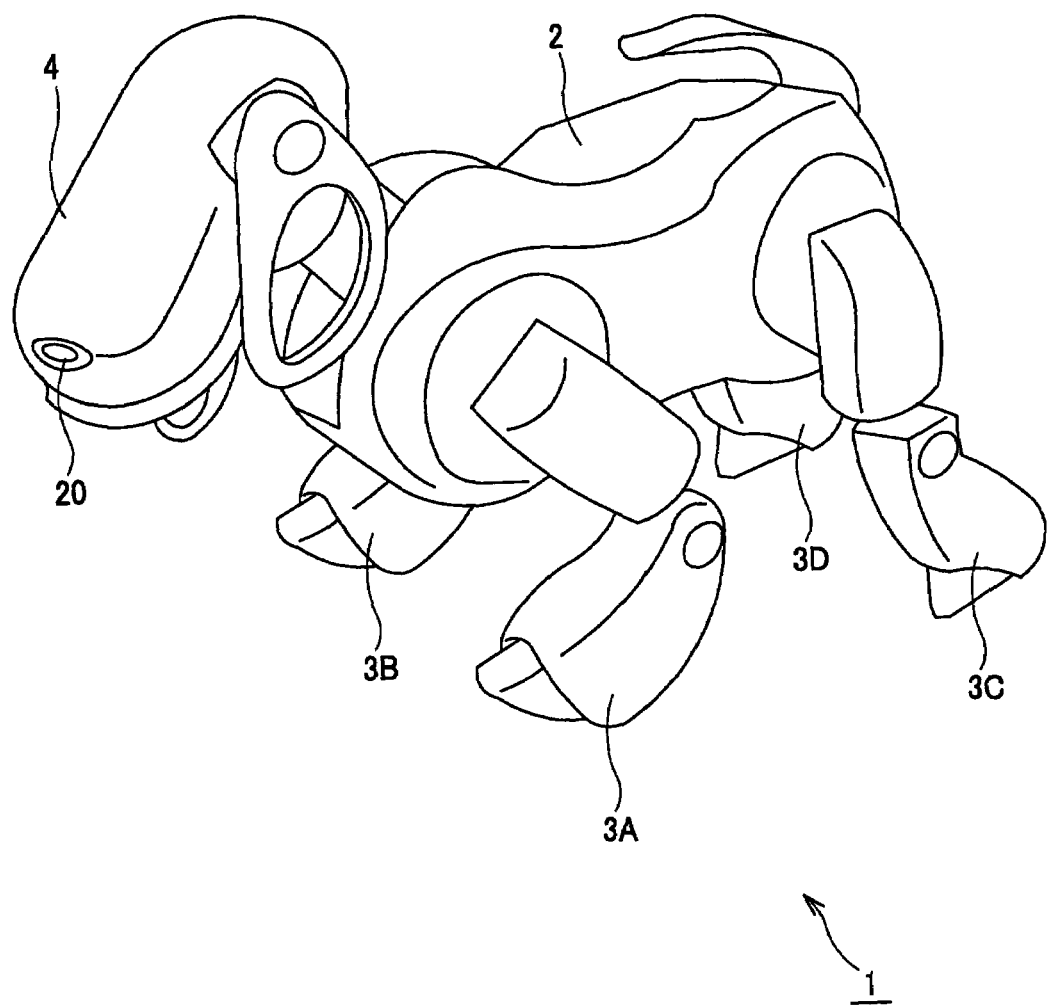
FIG. 18 is a perspective view of the robot apparatus according to an embodiment of this invention.

As FIG. 18 shows, the robot apparatus 1 according to this embodiment is a four-legged one that can walk. It comprises a trunk unit 2, leg units 3a, 3b, 3c and 3d, and a head unit 4. The foreleg units 3a and 3b are coupled to the front part of the trunk unit 2. The hind-leg unit 3c and 3d are coupled to the rear part of the trunk unit 2. The head unit 4 is coupled to the front end of the trunk unit 2.

Figure 19:
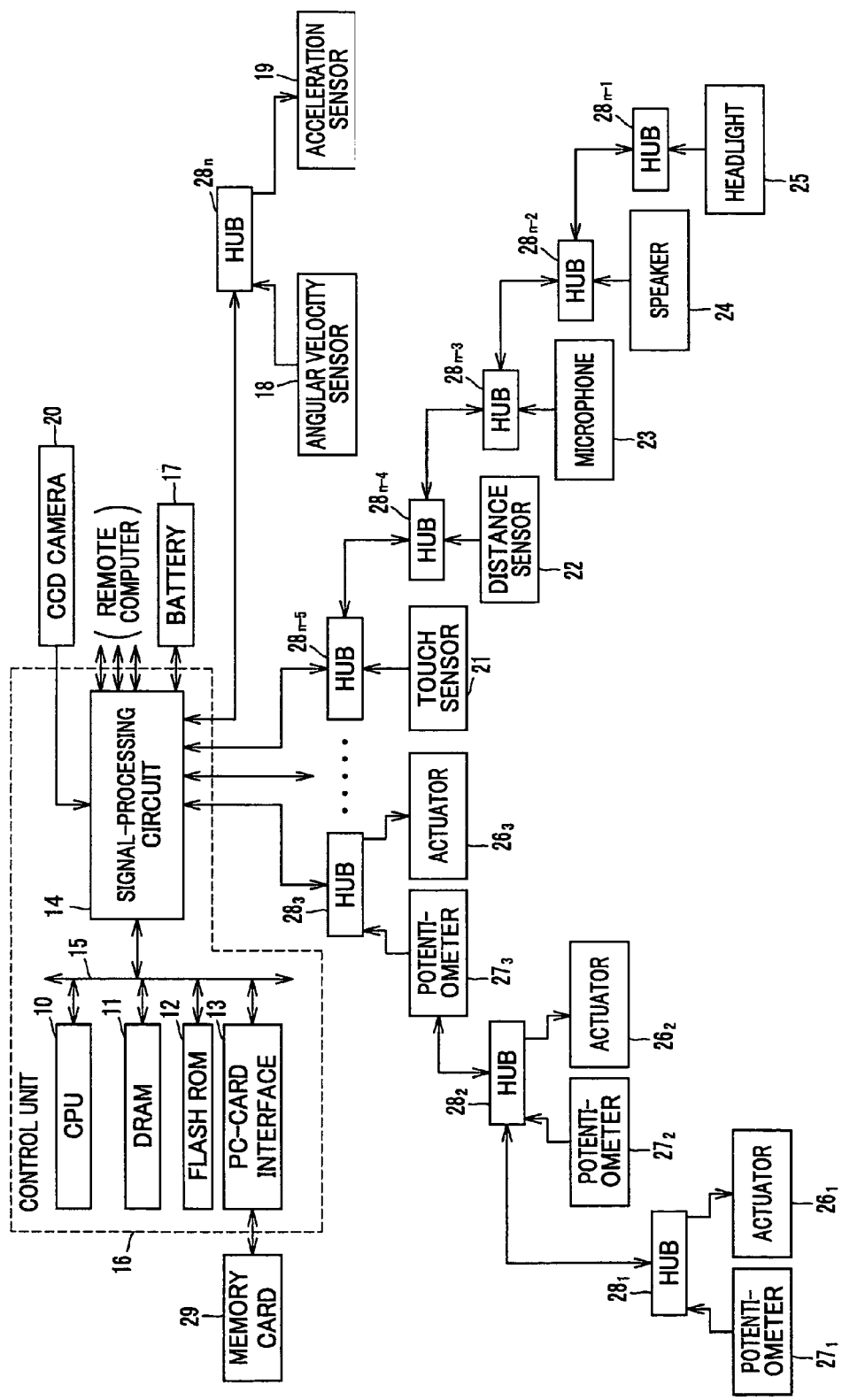
FIG. 19 is a block diagram illustrating the circuit configuration of the robot apparatus.

As FIG. 19 depicts, the trunk unit 2 contains a control unit 16 and a battery 17. The control unit 16 comprises a CPU (Central Processing Unit) 10, a DRAM (Dynamic Random Access Memory) 11, a flash ROM (Read Only Memory) 12, a PC (Personal Computer) card interface circuit 13, a signal-processing circuit 14, and an internal bus 15. The internal bus 15 connects the other components of the control unit 16. The trunk unit 2 contains a angular velocity sensor 18 and an acceleration sensor 19. The sensor 18 detects the orientation of the robot apparatus 1. The sensor 19 detects how fast the robot apparatus 1 is moving.

The head unit 4 incorporates a CCD camera 20, a touch sensor 21, a distance sensor 22, a microphone 23, a speaker 24, a headlight 25, and LEDs (light-emitting diodes, not shown), which are arranged at specific positions. The CCD camera 20 takes pictures of the objects surrounding the robot apparatus 1 and detects the ambient brightness. The touch sensor 21 detects any physical action that the user makes on the robot apparatus 1, such forward or backward slanting of the apparatus 1. The distance sensor 22 measures the distance to an object that exists in front of the robot apparatus 1. The microphone 23 detects sound made far and near the robot apparatus 1. The speaker 24 converts audio signals into sound. The headlight 25 may be mounted on the head unit 4. The LEDs act as "eyes" of the robot apparatus 1. Various sensors other than the touch sensor 21 are provided at specific positions in the trunk unit 2 and head unit 4.

Actuators $26_1$ to $26_n$ and potentiometers to $27_1$ to $27_n$, where n is the number of degrees of freedom, are provided at the joints in the leg units 3a to 3d and the joints coupling the leg units 3a to 3d to the trunk unit 2. The actuators $26_1$ to $26_n$ have a servo motor each. The servo motors of the actuators $26_1$ to $26_n$ control the leg units 3a to 3d, whereby the robot apparatus 1 takes any desired posture and makes any desired motion.

The sensors, such as angular velocity sensor 18, acceleration sensor 19, touch sensor 21, distance sensor 22, microphone 23, speaker 24, potentiometers $27_1$ to $27_n$, and the headlight 25, the LEDs and actuators $26_1$ to $26_n$ are connected to the signal-processing circuit 14 of the control unit 16 by hubs $28_1$ to $28_n$ associated with them. The CCD camera 20 and the battery 17 are directly connected to the signal-processing circuit 14.

The signal-processing circuit 14 receives the sensor data, video data and audio data from the above-mentioned sensors and stores these data items into specified storage areas of the DRAM 11 via the internal bus 15. The signal-processing circuit 14 receives battery-power data from the battery 17 and stores this data in a specified storage area of the DRAM 11. The battery-power data represents the power remaining in the battery 17.

The CPU 10 will use the sensor data, video data, audio data and the battery-power data in order to control the other components of the control unit 16.

When the power switch on the robot apparatus 1 is closed, initializing the apparatus 1, the CPU 10 reads the control program stored in the flash ROM 12. Alternatively, the CPU 10 reads, via the interface circuit 13, the control program stored in the memory card 29 that is inserted in the PC card slot (not shown) of the trunk unit 2. Then the control program is stored in the DRAM 11.

The CPU 10 determines the conditions of the apparatus 1 and the conditions of any objects surrounding the apparatus 1, from the sensor data, video data, audio data and battery-power data stored into the DRAM 11 from the signal-processing circuit 14. The CPU 10 also determines whether the user has given any instructions or made any action to the robot apparatus 1.

The CPU 10 determines what action the robot apparatus 1 should do, from the conditions it has determined and the control program stored in the DRAM 11. On the basis of the decision it has thus made, the CPU 10 drives the actuators $26_1$ to $26_n$. So driven, the actuators $26_1$ to $26_n$ rotates the head unit 4 up and down, from left to right and vice versa and drives the leg units 3A to 3D. The robot apparatus 1 is thereby made to walk or perform any other action.

If necessary, the CPU 10 generates audio data and supplies it via the signal-processing circuit 14 to the speaker 24. The speaker 24 generates sound from the audio data. Further, the CPU 10 may cause the LEDs to emit light continuously or intermittently. The CPU 10 may cause the CCD camera 20 to detect the ambient brightness and turns on the headlight 25 in accordance with the brightness, as will be described later.

Thus, the robot apparatus 1 can autonomously act on the basis of with the internal and external conditions it has detected and in accordance with the instructions the user has made.

(3-2) Configuration of the Control Program

Figure 20:
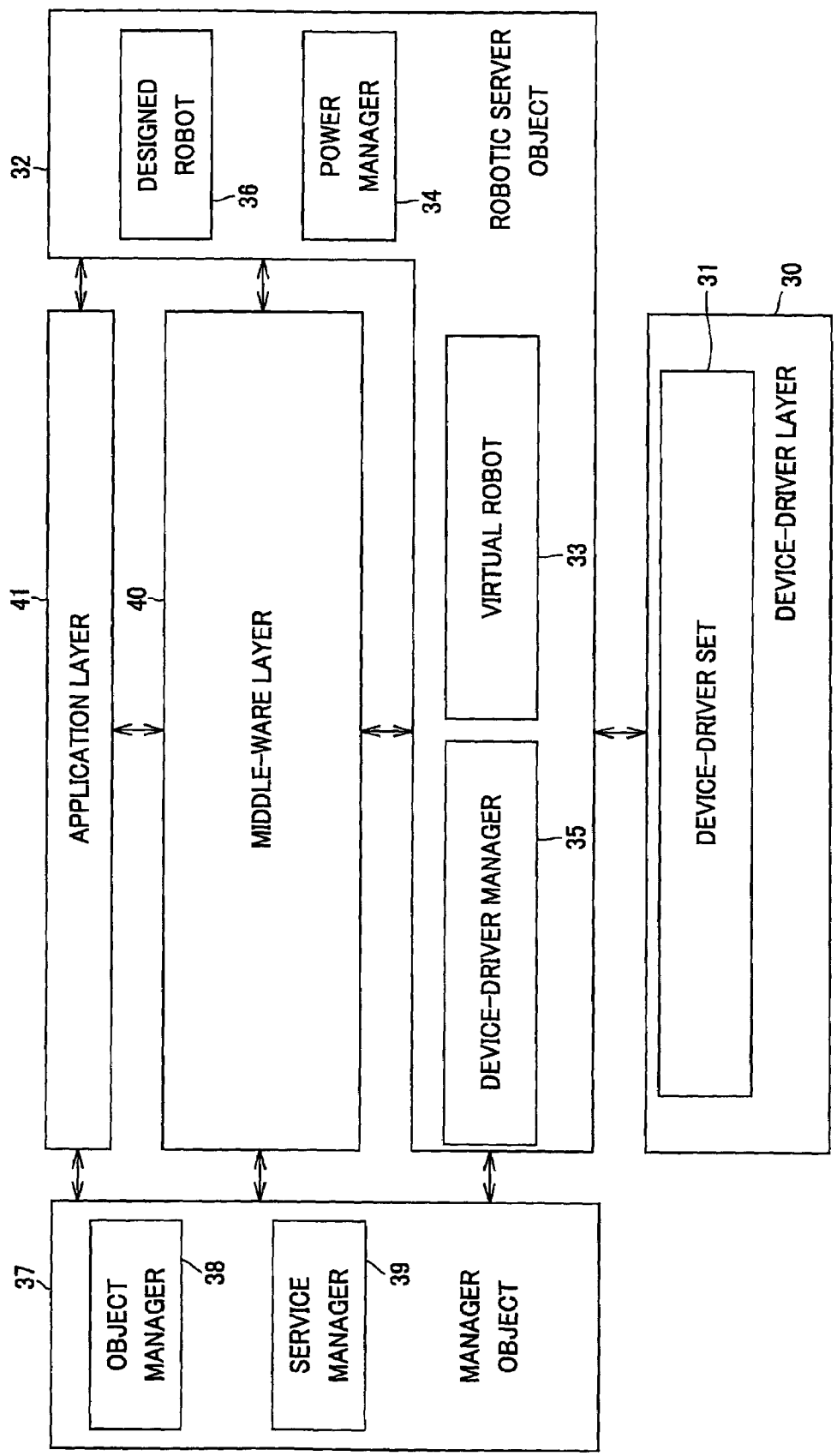
FIG. 20 is a block diagram showing the software configuration of the robot apparatus.

FIG. 20 shows the configuration of the above-described control program used in the robot apparatus 1. As seen from FIG. 20, the device-driver layer 30 is the lowest layer of this control program and comprises a device-driver set 31. The set 31 is composed of a plurality of device drivers. The device drivers are objects, such as the CCD camera 20 (FIG. 19) or a timer, which are allowed to access the hardware components used in ordinary computers. Upon receiving interruptions from the associated hardware component, each device drivers performs its function.

The robotic server object 32 lies immediately above the device-driver layer 30. The object 32 comprises a virtual robot 33, a power manager 34, a device-driver manager 35, and a designed robot 36. The virtual robot 33 is composed of a software group that provides an interface for accessing the hardware including the above-mentioned sensors and the actuators $26_1$ to $26_n$. The power manager 34 is a group of software items that control the switching of the power supplies. The device-driver manager 35 is a group of software items that control various device drivers. The designed robot 36 is a group of software items that control the mechanism of the robot apparatus 1.

The manager object 37 comprises an object manager 38 and a service manager 39. The object manager 38 is a group of software items that control the activation and termination of every software item included in the robotic server object 32, middle-ware layer 40 and application layer 41. The service manager 39 is a group of software items that control the connection of the objects in accordance with the connection data. The control data is described in the connection file stored in the memory card 29 (FIG. 19).

The middle-ware layer 40 lies above the robotic server object 32. This layer 40 is a group of software items that provide the fundamental functions of the robot apparatus 1, such the function of processing image data and the function of processing audio data. The application layer 41 lies above the middle-ware layer 40. The layer 41 is a group of software items that determine which action the robot apparatus 1 should perform, from the data processed by the software items that constitute the middle-ware layer 40.

The middle-ware layer 40 and the application layer 41 will be described in terms of software configuration.

Figure 21:
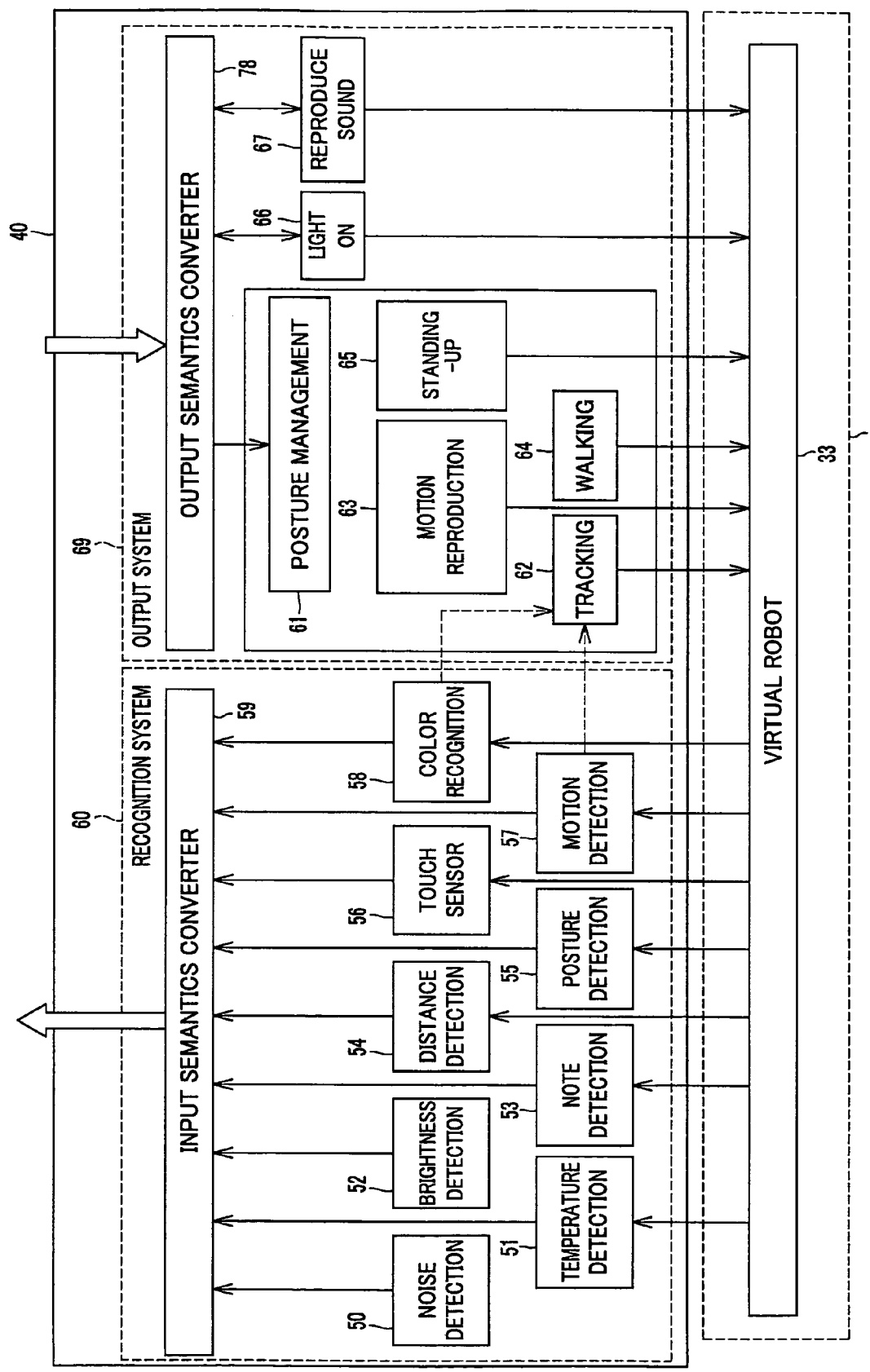
FIG. 21 is a block diagram representing the middle-ware layers of the software configuration of the robot apparatus.

As FIG. 21 shows, the middle-ware layer 40 comprises a recognition system 60 and an output system 69. The recognition system 60 has various signal-processing modules 50 to 58 and an input-semantics converter module 59. Among the modules 50 to 58 are a noise-detecting module, a temperature-detecting module, a brightness-detecting module, a sound-pitch-detecting module, a distance-detecting module, a posture-detecting module, a touch-detecting module, a motion-detecting module, and a color-detecting module. The output system 69 has signal-processing modules 61 to 67 and an output-semantics converter module 68. Among these signal-processing modules 61 to 67 are a tracking module, a motion-reproducing module, a walk module, a sit-up module, a light on-off module, and a sound-reproducing module.

The signal-processing modules 50 to 58 receive the sensor data, video data and audio data that the virtual robot 33 of the robotic server object 32 has read from the DRAM 11 (FIG. 19). The modules 50 to 58 perform prescribed processes in accordance with the data they have received. The results of these processes are input to the input-semantics converter module 59. The virtual robot 33 is designed to, for example, receive or convert signals in compliance with a particular communications protocol.

The input-semantics converter module 59 recognizes the external conditions, the internal conditions and the user's instructions and actions, on the basis of the results of the processes that the modules 50 to 58 have performed. The module 59 generates data representing the external and internal conditions and the user's instructions and actions. This data is output to the application layer 41 (FIG. 19). The external and internal conditions may be "noisy!," "hot!," "bright!," "pole, there," "toppled," "stroked," "slapped," "notes Do, Mi, So, heard," "something moving, spotted" "obstacle found," and so forth.

Figure 22:
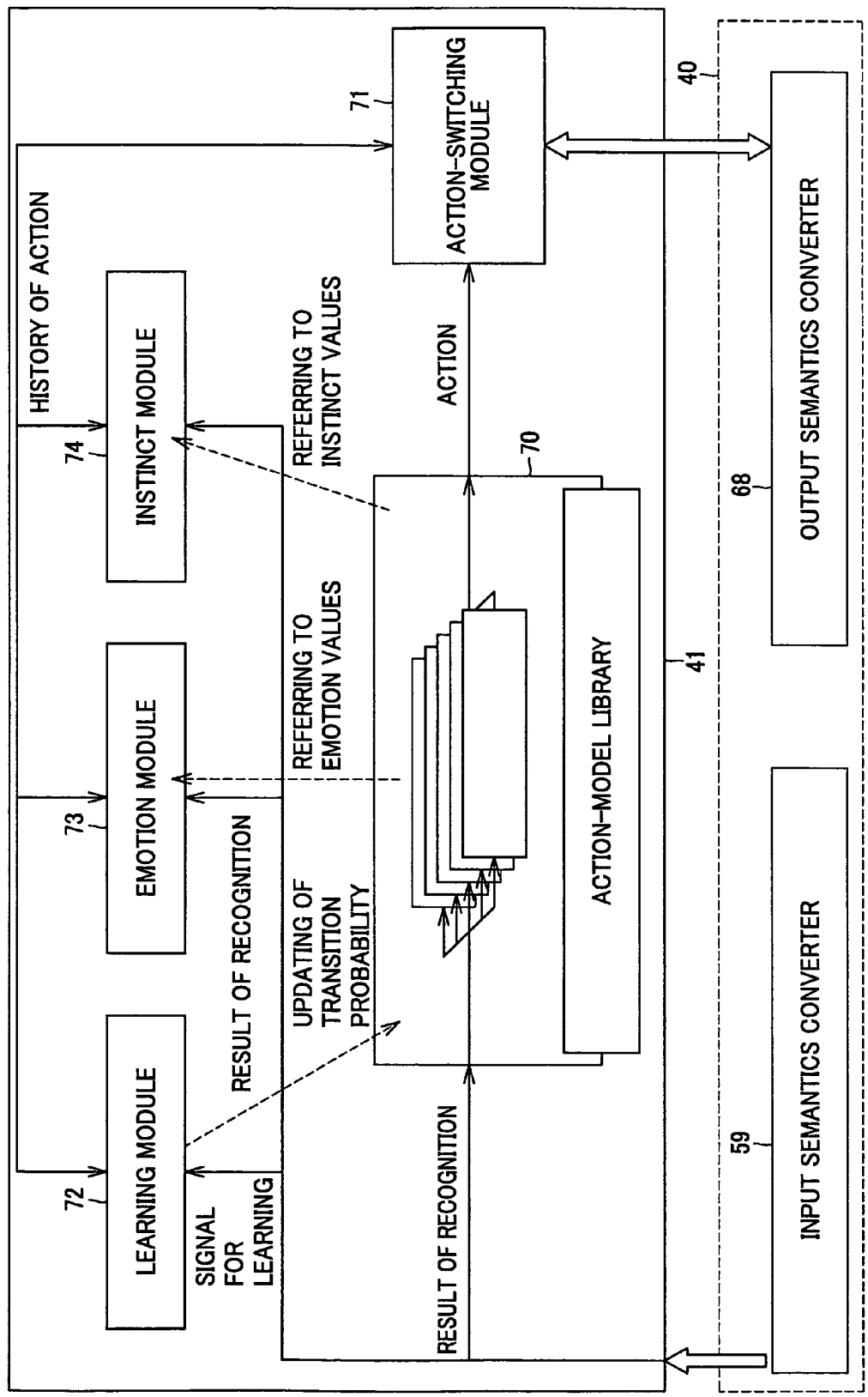
FIG. 22 is a block diagram representing the application layers of the software configuration of the robot apparatus.

As FIG. 22 shows, the application layer 41 comprises five modules. The modules are: an action-model library 70, an action-switching module 71, a learning module 72, an emotion module 73, and an instinct module 74.

Figure 23:
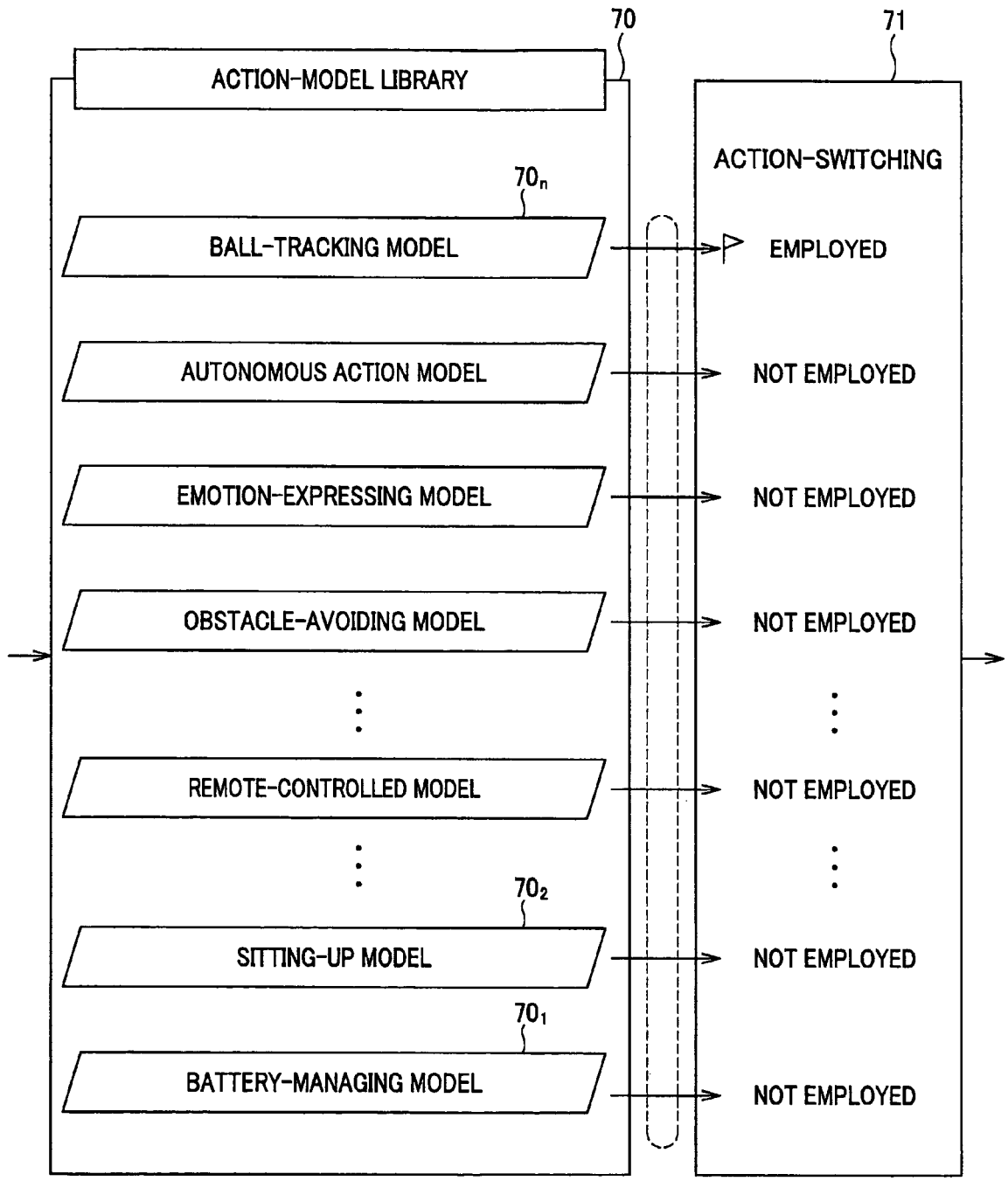
FIG. 23 is a block diagram representing the action-model library of the application layers.

As FIG. 23 depicts, the action-model library 70 stores various action models $70_1$ to $70_n$ that are independent of one another. The action models correspond to various conditions, respectively. The conditions are: "The battery power is insufficient," "I need to stand up," "I'll evade an obstacle," "I need to show my emotion," "I've spotted the pole," and so forth.

The action models $70_1$ to $70_n$ determine which action the robot apparatus 1 should perform next, upon receiving the results of recognition from the input-semantics converter module 59 or upon lapse of some time after they receive the results of recognition. To make this decision, the models $70_1$ to $70_n$ refer to the emotion-action parameters stored in the emotion module 73 and the desire parameters stored in the instinct module 74. The data representing the decision thus made is output to the action-switching module 71.

Figure 24:
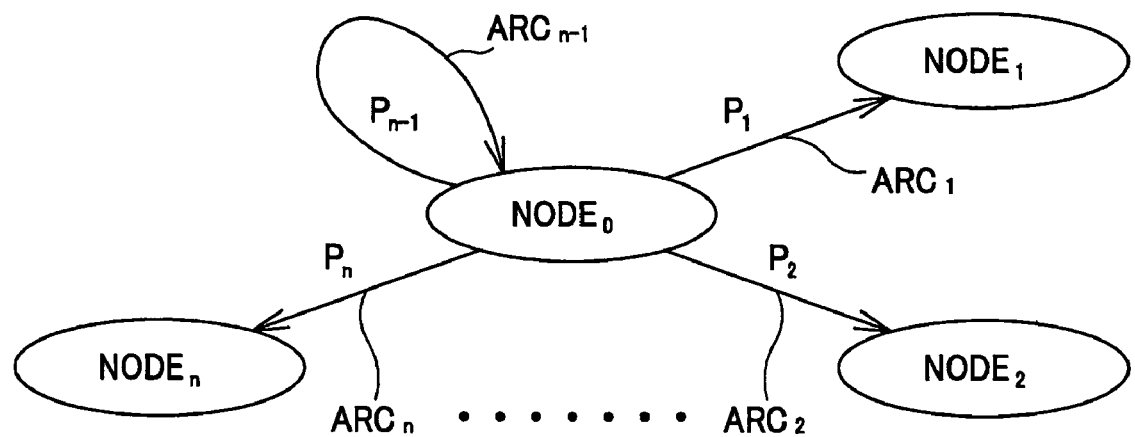
FIG. 24 is a diagram explaining a finite-probability automaton that serves as information for determining the action the robot apparatus will take.

In this embodiment, the action models $70_1$ to $70_n$ use an algorithm known as "finite-probability automaton." This algorithm finds that the state changes from which one of nodes (states) $NODE_0$ to $NODE_n$ to another node, as is illustrated in FIG. 24, in accordance with the transition probabilities $P_1$ to $P_n$ set for arcs $ARC_1$ to $ARC_n$ that connect the nodes $NODE_0$ to $NODE_n$.

The action models $70_1$ to $70_n$ are associated with the nodes $NODE_0$ to $NODE_n$. State-transition tables have been formulated for the nodes $NODE_0$ to $NODE_n$, respectively. FIG. 25 shows the state-transition table 80 prepared for one node.

In the state-transition table 80 of FIG. 25, the input events (results of recognition) that serve as transition conditions for the nodes $NODE_0$ to $NODE_n$ are recorded in column "event name," in the order of priority. Further, other conditions for each transition condition are recorded in columns "data name" and "data range."

In the case of the node $NODE_{100}$, for the event detected, "BALL (i.e., a ball has been found)," the size of the ball ranges from "0 to 1000" as is recorded in column "data range." Similarly, for the event detected, "OBSTACLE (i.e., an obstacle has been found)," the distance to the obstacle ranges from "0 to 100" as is recorded in column "data range."

Even if no results of recognition has been input for the node $NODE_{100}$, the state can change to another node if any parameter stored in the emotion module 73 falls within the range of "50 to 100." Note that the emotion module 73 and the instinct module 74 store emotion parameters and desire parameters, respectively, which the action models $70_1$ to $70_n$ cyclically referred to. Among the emotion parameters held in the emotion module 73 are: "joy," "surprise," "sadness."

In the state-transition table 80, the names of the nodes to which the state can change are recorded in the row "Destination Nodes" of column "Probability of Transition to Other Nodes." Also, the probabilities, for the state to change to other states when all conditions described in columns "data name" and "data range" are satisfied, are recorded in the respective rows of column "Probability of Transition to Other Nodes." The actions that the apparatus 1 should perform when the state changes, from one to any other, are described in the row "Output Action" of column "Probability of Transition to Other Nodes." Note that the sum of probabilities for each row of column "Probability of Transition to Other Nodes" is 100%.

For the node $NODE_{100}$, it may be recognized that "a ball has been found" and has a size ranging "0 to 100." In this case, the action data will be output, which represents that the state can change to $NODE_{120}$ (node 120) at the probability of 30%.

Each of the action models $70_1$ to $70_n$ is so designed that the nodes $NODE_0$ to $NODE_n$ described in the state-transition table 80 may be linked to one another. Thus, the state-transition table 80 for the nodes $NODE_0$ to $NODE_n$ is referred to, and the action the robot apparatus 1 should perform next is determined, when the results of recognition are supplied from the input-semantics converter module 59. The data representing the next action is output to the action-switching module 71.

The action-switching module 71 selects the action represented by the data output from one of the action models $70_1$ to $70_n$ (stored in the action-model library 70), which has the highest priority. Then, the module 71 generates a command for the action selected (hereinafter referred to as "action command"). The action command is supplied to the output-semantics converter module 68 incorporated in the middle-ware layer 40. In the present embodiment, the lower position each action model is illustrated in FIG. 23, the higher priority it has.

Upon receiving the data supplied from the output-semantics converter module 68 and representing the completion of the action, the action-switching module 71 informs the learning module 72, emotion module 73 and instinct module 74 that the apparatus 1 has performed the action.

The learning module 72 receives some of the results of recognition supplied from the input-semantics converter module 59. The results of recognition, which the module 72 receives, are the actions the user has made to the robot apparatus 1, such as "stroked," "slapped," and the like.

The learning module 72 changes the probabilities of state transition for the action models stored in the action-model library 70. More specifically, the probabilities of state transition are changed so that the probability of "slapping" may be reduced if the data from the action-switching module 71 represents that the apparatus 1 has been "slapped," and the probability of "stroking" may be increased if the data represents that the apparatus 1 has been "stroked."

The emotion module 73 holds parameters that represent various levels of each of six emotions "joy," "sadness," "anger," "surprise," "disgust" and "fear." These emotion parameters are periodically updated in accordance with the results of recognition supplied from the input-semantics converter module 59 (e.g., "slapped" and "stroked"), the time elapsed, and the notification from the action-switching module 71.

To be more specific, the emotion module 73 receives the results of recognition from the input-semantics converter module 59. From the results of recognition, the module 73 calculates an emotion parameter E[t+1] for the next cycle, in accordance with the following formula (15):

$$E[t+1]=E[t]+ke \times \Delta E[t] \quad (15)$$

where $\Delta E[t]$ is the emotion change, E[t] is the present emotion parameter, and ke is the coefficient showing the perceptibility of the emotion. The emotion parameter E[t+1] thus obtained is applied in place of the present emotion parameter E[t]. Thus, the emotion module 73 updates the emotion parameter. The module 73 updates any other emotion parameters in the same way.

It is predetermined how much the results of recognition or the notification from the output-semantics converter module 68 influences the emotion change $\Delta E[t]$. The result recognized, e.g., "slapped," greatly influences the change $\Delta E[t]$ in "anger." Likewise, the result recognized, e.g., "stroked," influences the change $\Delta E[t]$ in "joy") very much.

The "notification" from the output-semantics converter module 68 is so-called "feedback data" (showing an action completed). That is, this is the data representing an action the robot apparatus 1 has made. If the action completed may be "barking," the emotion "anger" will decrease to a low level. The notification from the module 68 is input to the learning module 72, too. In accordance with the notification, the learning module 72 changes the probabilities of state transition for the action models $70_1$ to $70_n$.

The results of actions may be fed back in the form of the data output from the action-switching module 71. (Any output of the module 71 represents an action the apparatus 1 makes in accordance with the emotion it has.)

The instinct module 74 holds four desire (instinct) parameters for "exercise," "affection," "appetite" and "curiosity." Each desire parameter represents the level of one desire. The instinct module 74 periodically updates these desire parameters on the basis of the results of recognition, the time elapsed, and the notification from the action-switching module 71.

More precisely, the instinct module 74 calculates the parameter I[k+1] of each desire for "exercise," "affection" or "curiosity" for the next cycle, from the results of recognition, the time elapsed, and the notification from the output-semantics converter module 68, by applying the following equation (16):

$$I[k+1]=I[k]+ki \times \Delta I[k] \quad (16)$$

where $\Delta I[k]$ is the change in desire, I[k] is the present desire parameter, and ki is the coefficient showing the perceptibility of the desire. The desire parameter I[k+1] thus calculated is applied in place of the present desire parameter I[k]. The instinct module 74 thus updates the emotion parameter. The module 73 updates any other desire parameters in the same way.

It is predetermined how much the results of recognition or the notification from the output-semantics converter module 68 influences the desire change $\Delta I[k]$. The notification from the module 68 greatly influences, for example, the change $\Delta I[k]$ in "fatigue."

In the present embodiment, the emotion parameters and the desire (instinct) parameters can change, in the range of 0 to 100. The coefficients ke and ki can have various values, each set for one emotion or one desire.

As is illustrated in FIG. 21, the output-semantics converter module 68 provided in the middle-ware layer 40 supplies various action commands to the signal-processing modules 61 to 67 of the output system 69. The action commands, generated by the action-switching module 71 of the application layer 41, causes the robot apparatus 1 to walk forwards, to express "joy," to bark, to track a ball and to perform some other actions.

In response to the action commands, the signal-processing modules 61 to 67 generate servo instructions, audio data and drive data. The servo instructions will be given to the actuators $26_1$ to $26_n$. The audio data will be supplied to the speaker 24 (FIG. 19). The drive data will be supplied to the LEDs (i.e., the eyes). The instructions, audio data and drive data are supplied to the actuators $26_1$ to $26_n$, the speaker 24, and the LEDs through the signal-processing circuit 14 (FIG. 19) and the virtual robot 33 of the robotic server object 32.

The robot apparatus 1 is thus designed to autonomously act on the basis of the control program with the internal and external conditions it has detected and in accordance with the instructions the user has given to it and the actions the user has made to it.

When the user is absent, the robot apparatus 1 may find that battery power is no longer sufficient. In this case, the apparatus 1 finds the pole and calculates the distance to the power-charging station. Then, the apparatus 1 walks to the power-charging station, where it has the battery recharged. As pointed out above, the robot apparatus 1 detects the pattern on the pole 100 and recognizes its own orientation from the pattern. Once the apparatus 1 has found the distance to the pole 100 from the output data of the distance sensor 22, it can recognize the position of the power-charging station and can then finds the best possible route it should walk to arrive at the power-charging station. Therefore, the robot apparatus 1 looks intelligent and is friendly and helpful to the user. This renders the robot apparatus 1 an efficient entertainment robot.

Using an object it can recognize, the robot apparatus 1 can reliably and efficiently identify the environmental conditions. A plurality of landmarks need not be provided in the room in which the apparatus 1 walks. Only if the pole 100 is placed in the room and has a pattern specific to the room, the robot apparatus 1 can not only recognize its orientation, but also identify the room and identify its own position in the room.

What is claimed is:

1. A direction-recognizing apparatus for recognizing at least N different directions (N≧2) by using a direction-indicating member, the apparatus comprising:
   memory means for storing N registered images for identifying the N directions and direction-data items associated with the registered images, respectively, each image including a physical pattern on a corresponding one of N surfaces of the direction-indicating member, each physical pattern unique with respect to other physical patterns on the N surfaces;

image-recognizing means for comparing an input image of the direction-indicating member, photographed in a given direction, with the N registered images, and for extracting one of the registered images which is determined to be identical or similar to the input image of the direction-indicating member; and direction-recognizing means for recognizing the direction in which the input image has been photographed, from the direction-data item associated with the registered image extracted, wherein the N surfaces of the direction-indicating member can be identified when viewed in the N different directions.

2. The direction-recognizing apparatus according to claim 1, wherein the N registered images include the images of the N surface segments of the direction-indicating member, respectively, are larger than the images of the N surface segments obtained by dividing the surface of the direction-indicating member by N and are associated with the N directions, and the direction-data items represent the N directions, respectively.

3. The direction-recognizing apparatus according to claim 2, wherein the registered images are used to identify surfaces, each being larger than a 360°/N surface segment, where 360° is the circumference of the direction-indicating member.

4. The direction-recognizing apparatus according to claim 2, wherein the direction-indicating member has, on the surface, a pattern that has no periodicity.

5. The direction-recognizing apparatus according to claim 4, wherein the registered images have been extracted from pattern data representing the pattern provided on the surface of the direction-indicating member, and each include the image of one of the N surface segments and is larger than the images of the N surface segments.

6. The direction-recognizing apparatus according to claim 1, wherein each of the registered images is an image of the direction-indicating member, photographed in one of the N directions.

7. The direction-recognizing apparatus according to claim 2, wherein the direction-indicating member is a pole, and the registered images are used to identify surface segments of the pole, which are larger than the N surface segments and each of which includes one of the N surface segments.

8. The direction-recognizing apparatus according to claim 2, wherein the image-recognizing means includes:

characteristic-extracting means for extracting characteristics from the input image and registered images;

characteristic-holding means for extracting a density-gradient direction histogram from density-gradient data about a region near the characteristics of the input image and the characteristics of each registered image and for holding the histogram thus extracted;

characteristic-comparing means for comparing the characteristics of the input image with the characteristics of each registered image, for finding a shortest inter-histogram distance by cyclically shifting one of the histograms of the images compared, in the direction of the density gradient, and for generating a candidate character pair that consists of two characteristics, the shortest distance for which is less than a prescribed threshold value, the shortest inter-histogram distance being the distance between the shifted histogram and the histogram closest to the shifted histogram; and estimating means for detecting a registered image that is identical or similar to the image of the direction-indicating member, included in the input image, by using the candidate character pair.

9. A direction-recognizing apparatus for recognizing at least N different directions (N≧2) by using a direction-indicating member, the apparatus comprising:

memory means for storing an image having N regions for identifying the N directions and storing direction-data items that are associated with the N regions of the image, respectively, each region including a physical pattern on a corresponding one of N surfaces of the direction-indicating member, each physical pattern unique with respect to other physical patterns on the N surfaces;

image-recognizing means for comparing an input image of the direction-indicating member, photographed in a given direction, with the N regions of the image, and for extracting one of the stored N regions of the image, which is determined to be identical or similar to the input image of the direction-indicating member; and direction-recognizing means for recognizing the direction in which the input image has been photographed, from the direction-data item associated with the stored region extracted, wherein the N surfaces of the direction-indicating member can be identified when viewed in the N different directions.

10. A method of recognizing at least N different directions (N≧2) by using a direction-indicating member, the method comprising:

comparing an input image of the direction-indicating member, photographed by an imaging device in a given direction, with N registered images stored in a computer readable memory identifying the N directions, and then extracting from the memory one of the registered images which is determined to be identical or similar to the input image of the direction-indicating member, each image including a physical pattern on a corresponding one of N surfaces of the direction-indicating member, each physical pattern unique with respect to other physical patterns on the N surfaces; and recognizing the direction in which the input image has been photographed, from the direction-data item associated with the registered image extracted, wherein the N surfaces of the direction-indicating member can be identified when viewed in the N different directions.

11. The method according to claim 10, wherein the N registered images include the images of the N surface segments of the direction-indicating member, respectively, are larger than the images of N surface segments obtained by dividing the surface of the direction-indicating member by N and are associated with the N directions, and the direction-data items represent the N directions, respectively.

12. The method according to claim 10, wherein the registered images are used to identify surfaces, each being larger than a 360°/N surface segment, where 360° is the circumference of the direction-indicating member.

13. The method according to claim 11, wherein the direction-indicating member has, on the surface, a pattern that has no periodicity.

14. The method according to claim 13, wherein the registered images have been extracted from pattern data representing the pattern provided on the surface of the direction-indicating member, and each include the image of one of the N surface segments and is larger than the images of the N surface segments.

15. The method according to claim 10, wherein each of the registered images is an image of the direction-indicating member, photographed in one of the N directions.

16. A method of recognizing at least N different directions (N≧2) by using a direction-indicating member, the method comprising:
comparing an input image of the direction-indicating member, photographed by an imaging device in a given direction, with N registered regions stored in a computer readable memory identifying the N directions, and then extracting from the memory one of the registered regions which is determined to be identical or similar to the input image of the direction-indicating member, each region including a physical pattern on a corresponding one of N surfaces of the direction-indicating member, each physical pattern unique with respect to other physical patterns on the N surfaces; and
recognizing the direction in which the input image has been photographed, from the direction-data item associated with the registered region extracted, wherein the N surfaces of the direction-indicating member can be identified when viewed in the N different directions.

17. A direction-recognizing system comprising:
a direction-indicating member which is used to recognize at least N different directions (N≧2), the direction-indicating member including N surfaces, each surface including a physical pattern unique with respect to other physical patterns on the N surfaces; and
a direction-recognizing apparatus which uses the direction-indicating member to recognize directions, wherein the N surfaces of the direction-indicating member can be identified when viewed in the N different directions, the direction-recognizing apparatus including,
memory means storing N registered images for identifying the N directions and direction-data items associated with the registered images, respectively, each image including the physical pattern on a corresponding one of N surfaces of the direction-indicating member;
image-recognizing means for comparing an input image of the direction-indicating member, photographed in a given direction, with the N registered images, and for extracting one of the registered images which is determined to be identical or similar to the input image of the direction-indicating member; and
direction-recognizing means for recognizing the direction in which the input image has been photographed, from the direction-data item associated with the registered image extracted.

18. A direction-recognizing system comprising:
a direction-indicating member which is used to recognize at least N different directions (N≧2), the direction-indicating member including N surfaces, each surface including a physical pattern unique with respect to other physical patterns on the N surfaces; and
a direction-recognizing apparatus which uses the direction-indicating member to recognize directions, wherein the N surfaces of the direction-indicating member can be identified when viewed in the N different directions, the direction-recognizing apparatus including,
memory means storing an image having N regions for identifying the N directions and storing direction-data items that are associated with the N regions of the image, respectively, each region including the physical pattern on a corresponding one of N surfaces of the direction-indicating member;
image-recognizing means for comparing an input image of the direction-indicating member, photographed in a given direction, with the N regions of the image, and for extracting one of the stored N regions of the image, which is determined to be identical or similar to the input image of the direction-indicating member; and
direction-recognizing means for recognizing the direction in which the input image has been photographed, from the direction-data item associated with the stored region extracted.

19. A robot apparatus that autonomously acts and has a direction-recognizing apparatus which uses a direction-indicating member to recognize at least N different directions (N≧2), the direction-recognizing apparatus comprising:
memory means storing N registered images for identifying the N directions and direction-data items associated with the registered images, respectively, each image including a physical pattern on a corresponding one of N surfaces of the direction-indicating member, each physical pattern unique with respect to other physical patterns on the N surfaces;
image-recognizing means for comparing an input image of the direction-indicating member, photographed in a given direction, with the N registered images, and for extracting one of the registered images which is determined to be identical or similar to the input image of the direction-indicating member; and
direction-recognizing means for recognizing the direction in which the input image has been photographed, from the direction-data item associated with the registered image extracted, wherein the N surfaces of the direction-indicating member can be identified when viewed in the N different directions.

20. The robot apparatus according to claim 19, wherein the N registered images include the images of the N surface segments of the direction-indicating member, respectively, are larger than the images of N surface segments obtained by dividing the surface of the direction-indicating member by N and are associated with the N directions, and the direction-data items represent the N directions, respectively.

21. A robot apparatus that autonomously acts and has a direction-recognizing apparatus which uses a direction-indicating member to recognize at least N different directions (N≧2), the direction-recognizing apparatus comprising:
memory means storing an image having N regions for identifying the N directions and storing direction-data items that are associated with the N regions of the image, respectively, each region including a physical pattern on a corresponding one of N surfaces of the direction-indicating member, each physical pattern unique with respect to other physical patterns on the N surfaces;
image-recognizing means for comparing an input image of the direction-indicating member, photographed in a given direction, with the N regions of the image, and for extracting one of the stored N regions of the image, which is determined to be identical or similar to the input image of the direction-indicating member; and
direction-recognizing means for recognizing the direction in which the input image has been photographed, from the direction-data item associated with the stored region extracted, wherein the N surfaces of the direction-indicating member can be identified when viewed in the N different directions.

22. A direction-recognizing apparatus for recognizing at least N different directions (N≧2) by using a direction-indicating member, the apparatus comprising:
a memory configured to store N registered images for identifying the N directions and direction-data items associated with the registered images, respectively, each image including a physical pattern on a corresponding one of N surfaces of the direction-indicating member, each physical pattern unique with respect to other physical patterns on the N surfaces;

an image-recognizing configured to compare an input image of the direction-indicating member, photographed in a given direction, with the N registered images, and to extract one of the registered images which is determined to be identical or similar to the input image of the direction-indicating member; and a direction-recognizing unit configured to recognize the direction in which the input image has been photographed, from the direction-data item associated with the registered image extracted, wherein the N surfaces of the direction-indicating member can be identified when viewed in the N different directions.

23. A direction-recognizing apparatus for recognizing at least N different directions (N≧2) by using a direction-indicating member, the apparatus comprising:

a memory configured to store an image having N regions for identifying the N directions and storing direction-data items that are associated with the N regions of the image, respectively, each image including a physical pattern on a corresponding one of N surfaces of the direction-indicating member, each physical pattern unique with respect to other physical patterns on the N surfaces;

an image-recognizing unit configured to compare an input image of the direction-indicating member, photographed in a given direction, with the N regions of the image, and for extracting one of the stored N regions of the image, which is determined to be identical or similar to the input image of the direction-indicating member; and a direction-recognizing unit configured to recognize the direction in which the input image has been photographed, from the direction-data item associated with the stored region extracted, wherein the N surfaces of the direction-indicating member can be identified when viewed in the N different directions.

24. The direction-recognizing apparatus according to claim 23, wherein the physical patterns include printed images on the N surfaces.

25. The direction-recognizing apparatus according to claim 23, wherein the physical patterns include projections or depressions on the N surfaces.

* * * * *